United States Patent [19]
Imai et al.

[11] Patent Number: 5,586,455
[45] Date of Patent: Dec. 24, 1996

[54] FLOAT-TYPE CLUTCH FOR AUTOMATIC WASHING MACHINE

[75] Inventors: Tooru Imai, Tajimi; Hiroshi Nishimura, Seto; Nobuichi Nishimura, Ichinomiya; Masahiro Imai, Tajimi; Kazutoshi Tani; Takayuki Hirano, both of Seto, all of Japan

[73] Assignee: Kabushiki Kaisha Toshiba, Japan

[21] Appl. No.: 412,271

[22] Filed: Mar. 28, 1995

[30] Foreign Application Priority Data

Mar. 30, 1994 [JP] Japan .................................. 6-061301
Mar. 31, 1994 [JP] Japan .................................. 6-063846

[51] Int. Cl.$^6$ ............................. D06F 23/04; D06F 37/40
[52] U.S. Cl. ............................................... 68/12.02; 68/23.7
[58] Field of Search ........................... 68/12.02, 23.6, 68/23.7, 133

[56] References Cited

U.S. PATENT DOCUMENTS

| | | | |
|---|---|---|---|
| 3,557,580 | 1/1971 | Racenis | 68/23.7 |
| 4,837,882 | 6/1989 | Brenner et al. | 8/159 |
| 4,998,052 | 3/1991 | Erdman et al. | 68/23.7 X |
| 5,381,677 | 1/1995 | Park et al. | 68/23.7 |

FOREIGN PATENT DOCUMENTS 0239261  9/1987  European Pat. Off. .

*Primary Examiner*—Philip R. Coe
*Attorney, Agent, or Firm*—Cushman Darby & Cushman IP Group Pillsbury Madison & Sutro, LLP

[57] ABSTRACT

An automatic washing machine includes a clutch float having external gear teeth. The clutch float is located around a shaft which is driven by an electric motor and to which an agitator is secured. The clutch float couples the shaft to an inner rotatable tub when its external gear teeth are engaged with internal gear teeth at the inner tub side in a dehydration step. The clutch float moves upwardly in subjection to buoyancy when water is supplied into the inner tub in a wash step. The external gear teeth of the clutch float are disengaged from the internal gear teeth so that the shaft is decoupled from the inner tub. The washing machine further includes a rotation restricting float which moves upwardly in subjection to the buoyancy in the wash step to couple the inner tub to an outer stationary tub and which decouples the inner tub from the outer tub in the dehydration step. A device delivers a position signal indicative of the position of the clutch float which is vertically movable. Based on the position signal, a control device controls the drive motor. The drive motor is of an outer rotor type and a motor control circuit is disposed in its stator.

25 Claims, 26 Drawing Sheets

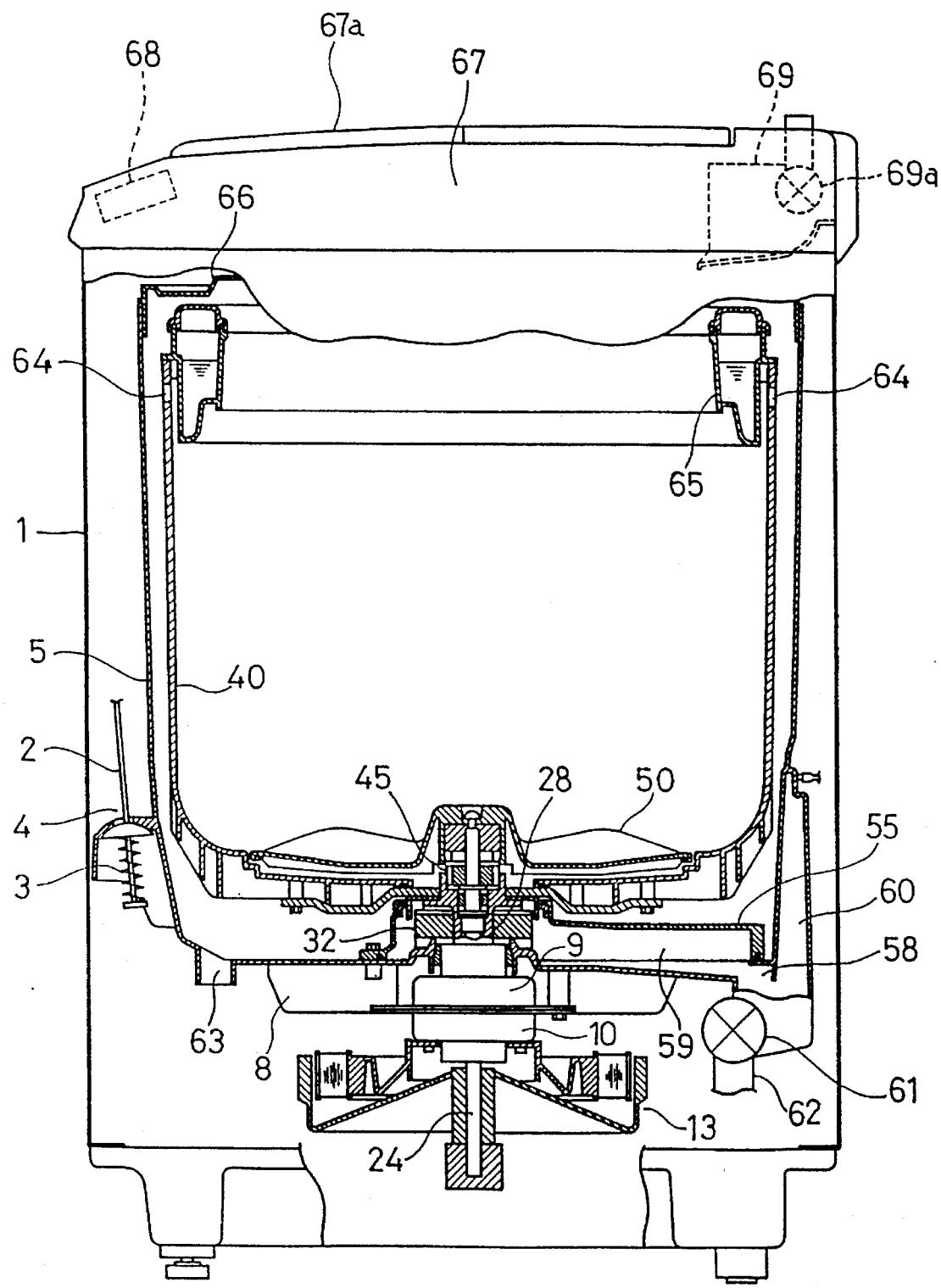
F I G. 2

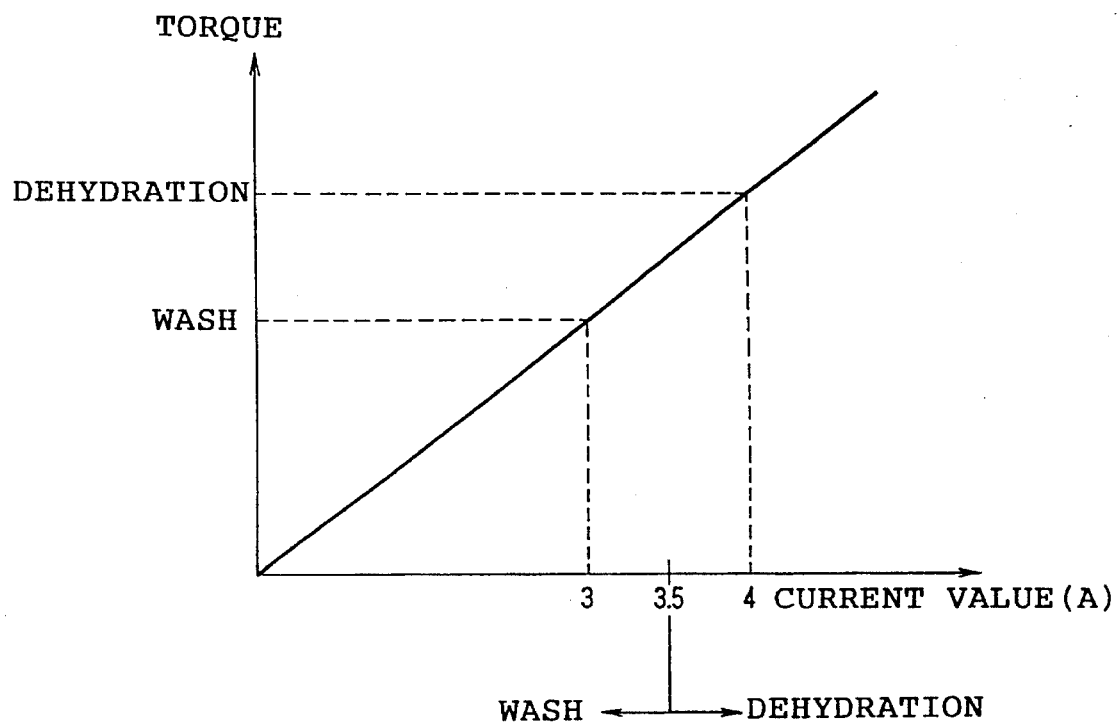
F I G. 1 6

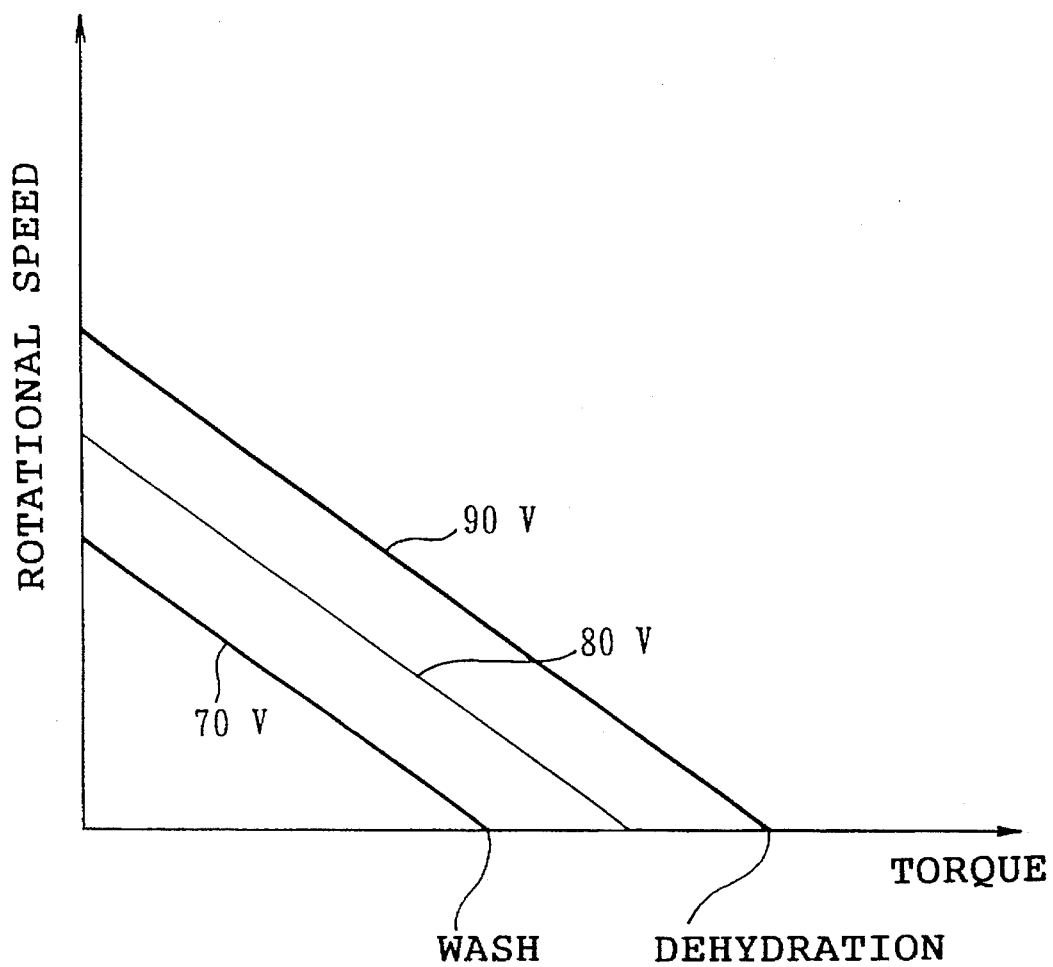
F I G. 1 9

FLOAT-TYPE CLUTCH FOR AUTOMATIC WASHING MACHINE

BACKGROUND OF THE INVENTION

1. Field of the Invention

This invention relates generally to a clutch mechanism of an automatic washing machine for transmitting power of a drive motor selectively to an agitator in a wash step and a rotatable tub and the agitator in a dehydration step, and more particularly to such a clutch mechanism wherein buoyancy of water is utilized for switching transmission of motor power between the wash and dehydration steps.

2. Description of the Prior Art

Automatic washing machines have conventionally been provided with a single electric motor driven in common for a washing operation and a dehydrating or spin drying operation. Power of the motor is transmitted to an agitator provided in a rotatable tub so that the agitator is driven in a wash step. On the other hand, the motor power is transmitted both to the agitator and to the rotatable tub so that they are driven in a dehydration step. A clutch mechanism has been employed for switching the transmission of the motor power between the wash and dehydration steps. The clutch mechanism conventionally comprises clutch springs provided in the midway of a power transmission path between the motor and the agitator and rotatable tub.

Each clutch spring employed in the above-described clutch mechanism requires high precision in its number of turns, its inner diameter and the like. Furthermore, electromagnets and an electric motor are required for controlling the movement of the clutch springs. Consequently, the conventional clutch mechanism has a complicate construction, resulting in increase in the manufacturing cost.

In view of the above-described problem, publication Nos. 57-103690 and 62-268343 of Japanese unexamined patent applications disclose improved automatic washing machines. In these automatic washing machines, a float chamber is formed on a bottom underside of a rotatable tub. The rotatable tub has a power receiving section which is usually engaged with a power transmitting member mounted together with the agitator on a shaft driven by a drive motor. Water is supplied into the rotatable tub in the wash step so that the water is reserved in the rotatable tub and an outer non-rotatable tub enclosing the former. The rotatable tub is caused to move upwardly when the float chamber is filled by air. Consequently, the power receiving section is disengaged from the power transmitting member such that the motor power is transmitted via the shaft only to the agitator but not to the rotatable tub. In the dehydration step, the water is discharged out of the rotatable and non-rotatable tubs. The rotatable tub is caused to move downwardly as the result of disappearance of the buoyancy such that the power receiving section thereof is re-engaged with the power transmitting member. Consequently, the motor power is transmitted via the shaft both to the agitator and to the rotatable tub in the dehydration step. The above-described power transmitting mechanism has a simple construction and does not require high precision for the parts, whereupon the washing machines can be manufactured at a low cost.

In the above-described construction, however, a space needs to be provided over the rotatable tub to allow the same to move upwardly in the wash step. There is a possibility that the laundry may be caused to scatter through the space out of the washing machine in the dehydration step where the rotatable tub is caused to move downwardly. Furthermore, the space increases the height of the washing machine, which makes it difficult for a user to take the laundry out of the rotatable tub. Additionally, the rotatable tub is sometimes inclined when lowering. When the motor power is transmitted to the inclined rotatable tub, it is swayed in the dehydration step, causing abnormal vibration.

SUMMARY OF THE INVENTION

Therefore, a primary object of the present invention is to provide an automatic washing machine which has a simple constructions and does not require high precision for the parts.

Another object of the invention is to provide an automatic washing machine wherein the laundry can be prevented from scattering out of the rotatable tub during the dehydrating operation.

Further another object of the invention is to provide an automatic washing machine wherein the laundry can be readily put into and taken out of the rotatable tub.

Further another object of the invention is to provide an automatic washing machine wherein occurrence of abnormal vibration due to the switching of power motor transmission can be prevented.

To achieve these and other objects, the present invention provides an automatic washing machine comprising a hollow outer shaft vertically supported via bearing means on a stationary member to be rotated around a vertical axis thereof, the outer shaft having an upper end, a rotatable tub for accommodating laundry therein, the rotatable tub having a central bottom coupled to the upper end of the outer shaft so as to be rotated by the outer shaft, an inner shaft rotatably inserted in the outer shaft with bearing means interposed therebetween, the inner shaft having an upper end projecting from the upper end of the outer shaft, an agitator coupled to the upper end of the inner shaft and disposed in the rotatable tub, an electric motor disposed at a side of the stationary member for driving the inner shaft, and control means for controlling the motor. A first float chamber is formed around a portion of the inner shaft projecting from the upper end of the outer shaft and communicating with the rotatable tub to be filled with water when water is supplied to the rotatable tub during a wash step. A clutch float is disposed in the first float chamber so as to be vertically movable along the inner shaft, the clutch float being movable relative to the rotatable tub, the clutch float being engaged with both of the outer and inner shafts to thereby couple the inner shaft to the outer shaft for transmission of rotation when assuming a first position where the clutch float is escaped from buoyancy, the clutch float being moved from the first position to a second position when subjected to the buoyancy, thereby decoupling the inner shaft from the outer shaft.

According to the automatic washing machine constructed as described above, the motor power is transmitted via the outer shaft to the rotatable tub, and the clutch float is moved between the first and second positions so that the transmission of motor power is performed and interrupted. The clutch float is caused to move by buoyancy of water. Since the small clutch float but not a large tub is moved by the water buoyancy in the above-described construction, a space for vertical movement of the clutch float is small. Accordingly, a space defined over the rotatable tub is rendered small. The clutch float is vertically moved smoothly as compared with the case where the tub is vertically moved by the water buoyancy. Furthermore, the employment of the clutch float simplifies the construction of the clutch mechanism and accordingly, high precision is not required with respect to the parts.

The clutch float preferably has a through hole through which the inner shaft extends and an outer circumferential face of the inner shaft and an inner circumferential face of the clutch float preferably include respective concave and convex engagement portions which are engaged with each other in a direction of rotation of the inner shaft so that the clutch float is rotatable with the inner shaft and movable axially of the inner shaft.

The clutch float preferably has gear teeth and the outer shaft preferably has gear teeth meshed with the gear teeth of the clutch float when the clutch float assumes the first position and disengaged from the gear teeth of the clutch float when the clutch float assumes the second position.

The gear teeth of the clutch float preferably comprise external gear teeth formed on the outer circumferential face of the clutch float so as to be circularly arranged and the gear teeth of the outer shaft preferably comprise internal gear teeth formed on the member at the rotatable tub side so as to be circularly arranged.

A row of the external gear teeth preferably has a generally conical outer circumference which is tapered to a distal end thereof invading an inner circumference of a row of the internal gear teeth.

The inner circumference of the row of the internal gear teeth preferably has a generally conical configuration corresponding to the outer circumference of the row of the external gear teeth and includes at a larger diameter side an end which has a diameter larger than a diameter of an end of the outer circumference of the row of the external gear teeth at a smaller diameter side of the latter.

The clutch float is preferably formed of a foamed polystyrene and has an air chamber serving as a buoyancy chamber.

The above-described automatic washing machine may further comprise a second float chamber provided outside the rotatable tub and communicating with the interior of the rotatable tub so as to be filled with water when the water is supplied into the rotatable tub and a rotation restricting float disposed in the another float chamber so as to be vertically movable in subjection to buoyancy. The rotation restricting float couples the rotatable tub to a stationary member when moved in subjection to buoyancy to thereby assume a first position, thereby restricting free rotation of the rotatable tub. The rotation restricting float decouples the rotatable tub from the stationary member when assuming a second position where the rotation restricting float is escaped from the buoyancy, thereby releasing the rotatable tub from a restricted state.

The rotation restricting float and the stationary member preferably include respective concave and convex engagement portions engageable with each other in a direction of rotation of the rotation restricting float and allowing an axial movement of the rotation restricting float between the first and second positions. The concave and convex engagement portions of the rotation restricting float and the stationary member are preferably engaged with each other so that rotation of the rotation restricting float is restricted by the stationary member. The rotation restricting float preferably has gear teeth and other gear teeth are preferably provided at the rotatable tub side. The gear teeth of the rotation restricting float are meshed with the gear teeth at the rotatable tub side when the rotation restricting float assumes the third position, whereby rotation of the rotatable tub is restricted. The gear teeth of the rotation restricting float are disengaged from the gear teeth at the rotatable tub side when the rotation restricting float assumes the fourth position, whereby the rotatable tub is released from a restricted state.

The automatic washing machine may further comprise a stationary tub enclosing the rotatable tub and having a drain hole in a bottom thereof. The rotatable tub has a hole formed in a bottom thereof for serving for drainage and dehydrating holes formed only in an upper circumferential wall thereof so that the water in the rotatable tub is discharged into the stationary tub by a centrifugal force caused by high speed rotation of the rotatable tub. A water guide cover is disposed for defining a water flow path between the hole of the rotatable tub and the drain hole of the stationary tub.

The automatic washing machine may further comprise position determining means for determining as to which of the first or second position the clutch float assumes, thereby generating a position signal.

The position determining means preferably comprises means for determining an amount of load applied to the motor during execution of the wash or a dehydration step, means for determining a value of current flowing into the motor during execution of a wash or dehydration step, means for determining a value of voltage applied to the motor during execution of the wash or a dehydration step, or means for determining a rotational speed of the motor during execution of the wash or a dehydration step.

The motor control means may comprise short period reversion control means for reversing a direction of motor rotation in a short period shorter than a normal reversing period during execution of the wash step so that the motor is intermittently driven, when the position signal generated by the position determining means indicates that the position of the clutch float is abnormal. A mode of control starting with a determining operation of the position determining means and ending with an intermittent drive of the motor by the short period reversion control means is preferably repeated at a plurality of times.

The motor control means may further comprise deceleration control means for decelerating the motor from a current speed thereof when the position signal generated by the position determining means indicates that the position of the clutch float is abnormal. A mode of control starting with a determining operation of the position determining means and ending with deceleration of the motor by the deceleration control means is preferably repeated at a plurality of times.

The automatic washing machine may further comprise warning means for warning of an abnormal condition when the position signal generated by the position determining means indicates that the position of the clutch float is abnormal.

The motor preferably comprises a stator and a rotor disposed around the stator and the motor control means preferably comprises an electric circuit board disposed on the stator of the motor.

The rotor of the motor preferably has a blade and a number of ventilating holes through which a flow of air is circulated by the blade so as to pass in the vicinity of the circuit board.

The rotor of the motor may be directly connected to the shaft and the motor control means may control a rotational speed of the motor.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 2 is a longitudinal sectional side view of the automatic washing machine;

FIG. 16 is a graph showing the torque and current characteristic of the motor employed in the automatic washing machine of the first embodiment;

FIG. 19 is a graph showing the speed and torque characteristics of the motor employed in the washing machine of the sixth embodiment;

DETAILED DESCRIPTION OF THE PREFERRED EMBODIMENTS

Figure 3:
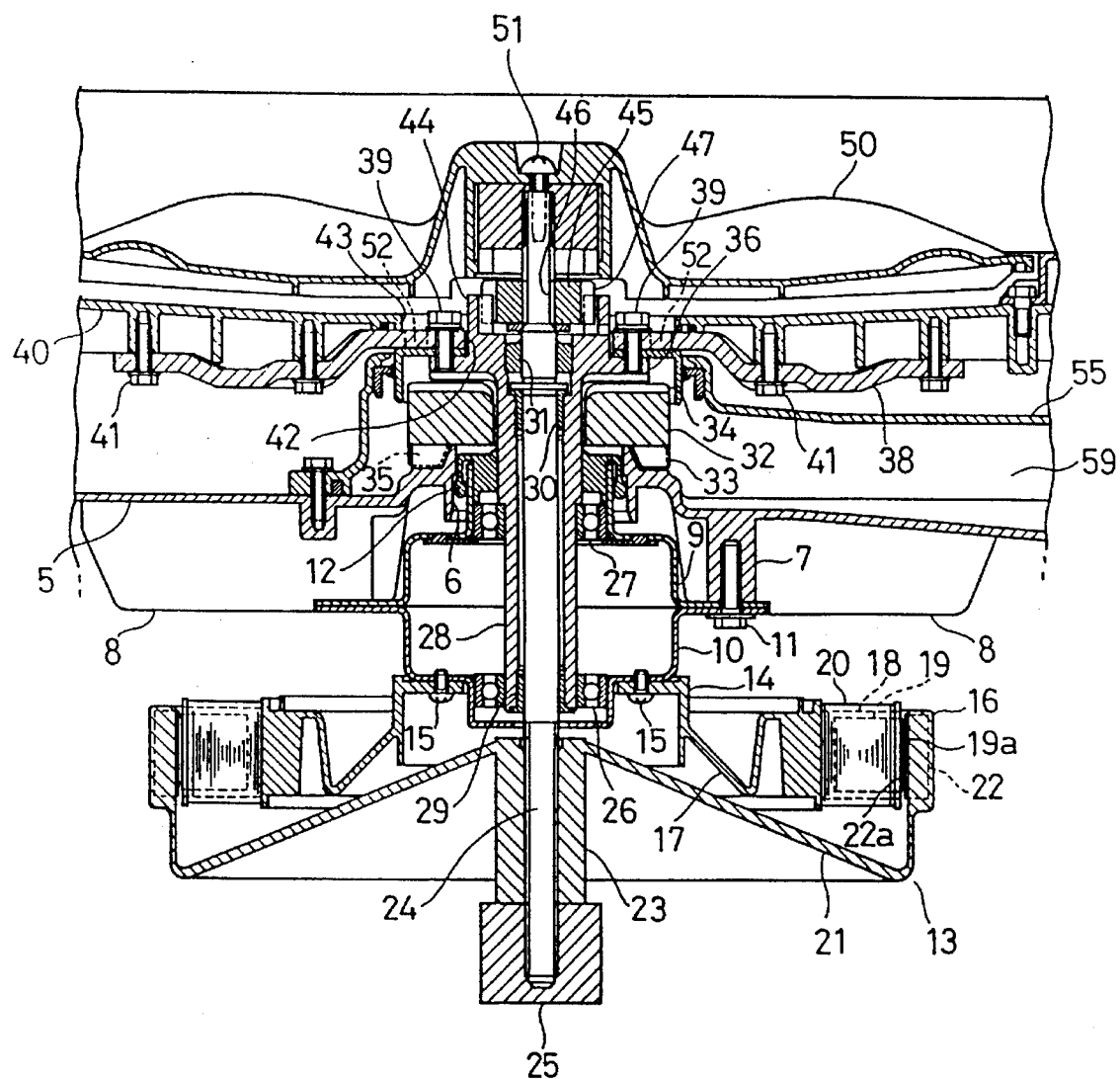
FIG. 3 is a longitudinal sectional view of a motor and clutch mechanism employed in the washing machine.

A first embodiment of the present invention will be described with reference to FIGS. 1 to 8. Referring to FIG. 2, an automatic washing machine of the first embodiment is shown. An outer cabinet I encloses an outer stationary tub 5 serving as a stationary member and suspended by a suspension mechanism 4 comprising a plurality of suspension rods 2 one of which is shown and coil springs 3 mounted on the rods 2 respectively. The outer tub 5 has a hole 6 formed in the central bottom thereof, as shown in FIG. 3. The hole 6 has a relatively large diameter. The bottom of the outer tub 5 further has a plurality of bosses 7 (one of them being shown) projecting downward and located around the hole 6 and a plurality of reinforcing ribs 8. An upper bracket 9 and a lower bracket 10 are mounted to the bosses 7 by bolts 11. The upper bracket 9 includes a portion watertightly inserted into the hole 6 with a seal 12 interposed between the circumference of the hole 6 and said portion.

A stator 14 of an electric motor 13 is mounted to the lower bracket 10 by screws 15. A variable speed type motor such as an inverter-controlled motor or a brushless motor is employed as the motor 13 so that a rotational speed is varied between one suitable for a wash step and another suitable for a dehydration step. Furthermore, the motor 13 is of an outer rotor type. More specifically, the motor 13 includes a rotor 16 surrounding the stator 14. A rotor core 19 is inserted into a predetermined number of bobbins 18 provided around a stator base 17 formed of a plastic material. A coil 20 is wound on the rotor core 19, and an outer end surface 19a of the rotor core 19 is opposed to inner end surfaces 22a of a predetermined number of magnets 22 provided around a rotor base 21 formed of a plastic material.

The rotor base 21 of the motor 13 has an outer central hollow shaft 23. An inner shaft 24 is inserted in the hollow shaft 23, and a cap nut 25 is secured to a lower end of the shaft 24 so that the latter is prevented from falling out. The shaft 24 is rotatably supported on a lower metal bearing 29 and an upper metal bearing 30 in a hollow external shaft 28 which is inserted through the upper and lower brackets 9 and 10 and supported on a lower ball bearing 26 and an upper ball bearing 27. The above-mentioned seal 12 and another seal 31 are provided for preventing leakage of water.

A rotation restricting float 32 is disposed around a portion of the external shaft 28 projecting into the outer tub 5 so that the float is vertically movable. The rotation restricting float 32 is formed of a material whose specific gravity is smaller than "1" or which stays on the surface of the water, e.g. plastics. In the embodiment, the float 32 is formed of a foamed polystyrene which is cost-effective and obtainable easily. The float 32 has a number of lower gear teeth 33 formed radially on a lower outer circumference thereof as shown in FIG. 4 and a number of upper gear teeth 34 formed radially on an upper outer circumference thereof as shown in FIG. 5.

Figure 4:
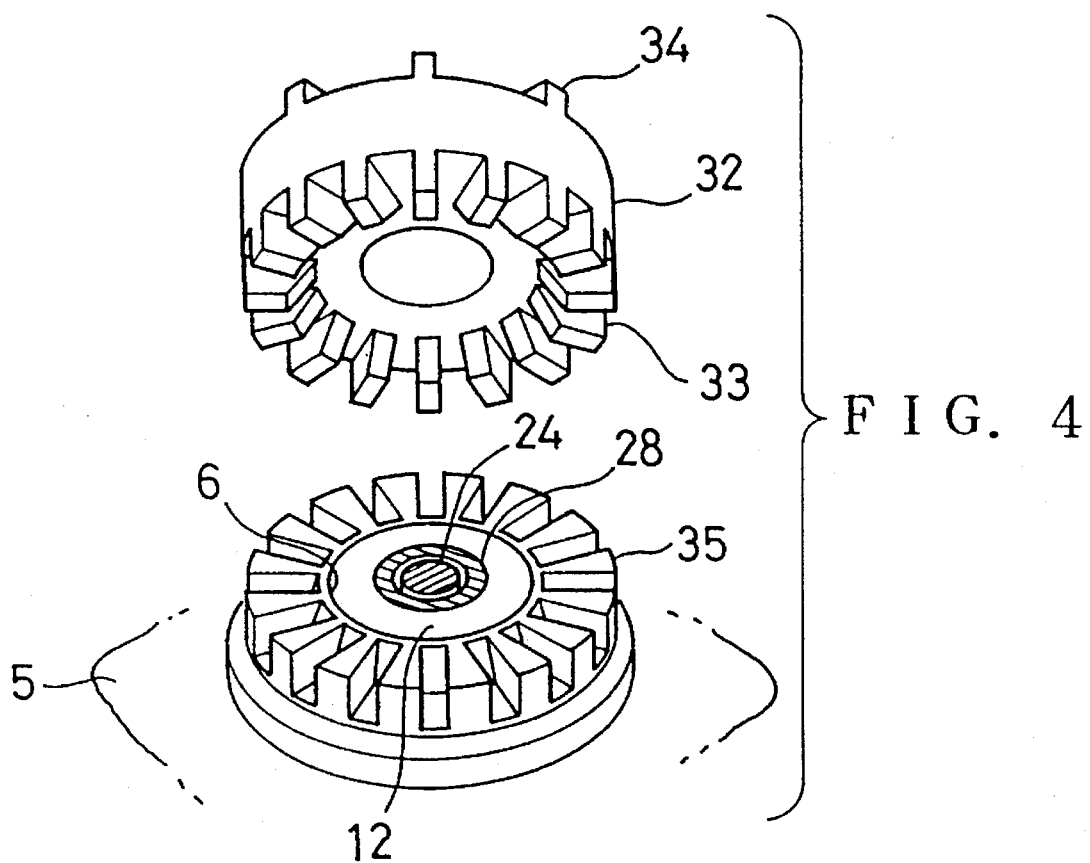
FIG. 4 is an exploded perspective view of a rotation restricting float and gear teeth of an external shaft.
Figure 5:
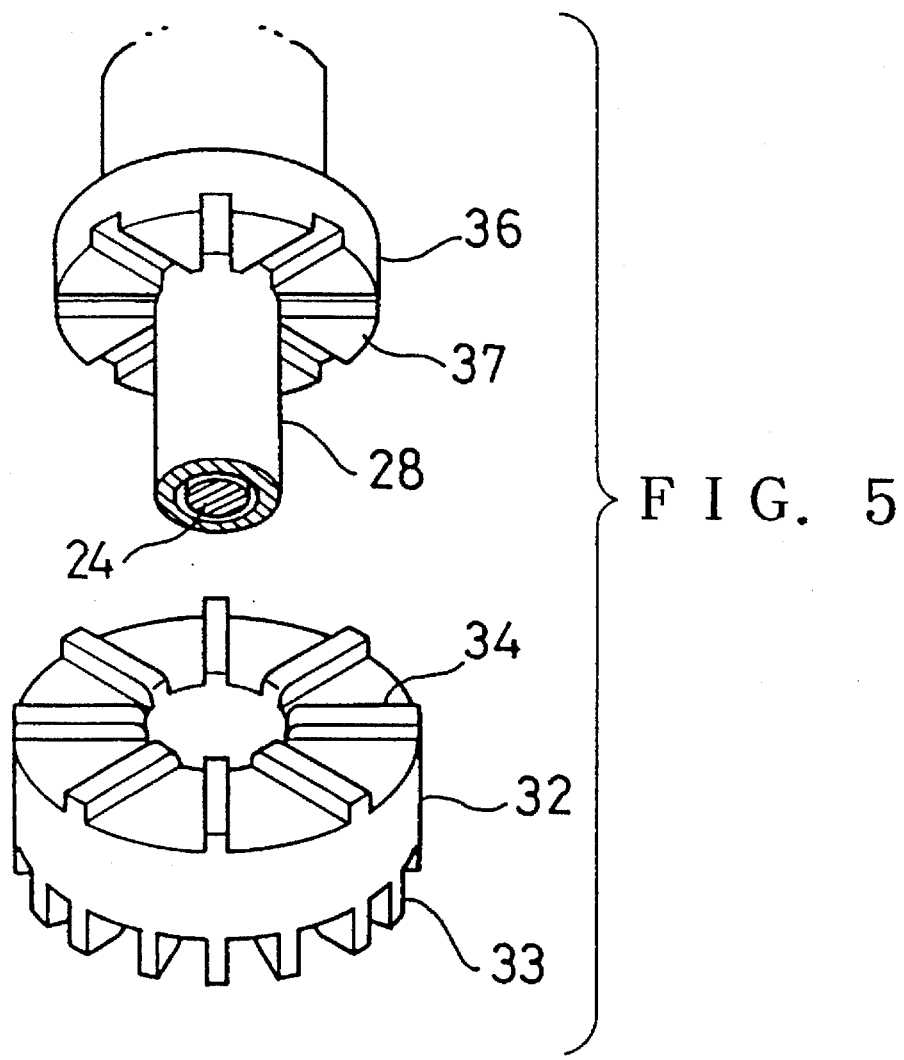
FIG. 5 is an exploded perspective view of the rotation restricting float and other gear teeth of the external shaft.

The outer tub 5 serving as the stationary member has a number of gear teeth 35 extending radially from an upper circumferential edge of the hole 6, as shown in FIG. 4. The lower gear teeth 33 of the rotation restricting float 32 are meshed with the gear teeth 35 from above the same, so that the float 32 is normally coupled to the outer tub 5 with respect to a direction of rotation of the float 32. Thus, the float 32 is restricted by concave and convex engagement portions provided by the gear teeth 33 and 35 so as to be vertically movable but so as not to be rotatable relative to the outer tub 5. The external shaft 28 has a flange 36 formed on a portion thereof located far above the float 32. The flange 36 has gear teeth 37 formed on an underside thereof, as shown in FIG. 5. The upper gear teeth 34 of the float 32 is caused to face to the gear teeth 37.

A support plate 38 is mounted to the flange 36 of the external shaft 28 by a plurality of bolts 39, as shown in FIG. 3. An inner rotatable tub 40 enclosed in the outer tub 5 is mounted to the support plate 38 by a plurality of bolts 41. The support plate 8 and the bottom of the inner tub 40 have respective central holes 42 and 43. A ring 44 formed on the upper end of the external shaft 28 is located in the holes 42 and 43. The upper portion of the shaft 24 extending over the ring 44 projects into the inner tub 40.

Figure 6:
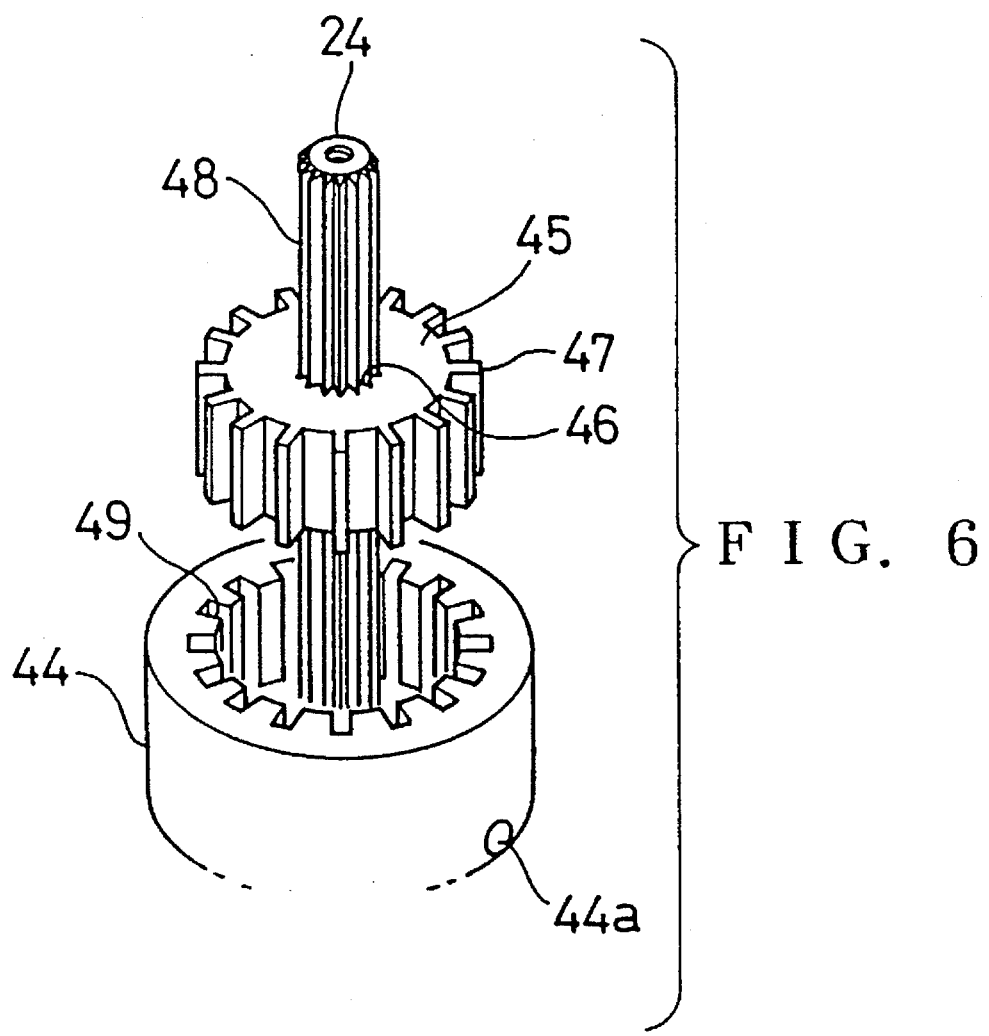
FIG. 6 is an exploded perspective view of a clutch float and internal gear teeth of the external shaft.

A clutch float 45 is disposed around the upper portion of the shaft 24. The clutch float 45 is formed of a foamed polystyrene in the same way as the rotation restricting float 32. The clutch float 45 has a number of internal gear teeth 46 on an inner circumference thereof and a number of external gear teeth 47 formed on an outer circumference thereof, as shown in FIG. 6.

The shaft 24 has a number of external gear teeth 48 axially extending on the outer circumference thereof which is longer than the width of the clutch float 45. The external gear teeth 48 constitute a concave and convex engagement structure together with the internal gear teeth 46. In the embodiment, particularly, a serration joint structure is constituted by internal and external gear teeth 46 and 48. More specifically, the internal gear teeth 46 are meshed with the external gear teeth 48 such that rotative movement of the clutch float 45 is restricted relative to the shaft 24 while its axial movement is allowed. The ring 44 of the external shaft 28 has internal gear teeth 49 formed on an inner circumference thereof. The external gear teeth 47 of the clutch float 45 are meshed with the internal gear teeth 49 such that the clutch float 45 couples the shaft 24 to the inner tub 40. The ring 44 further has a drain hole 44a formed in the lowermost outer circumference thereof. An agitator 50 disposed on the bottom of the inner tub 40 is secured to the upper end of the shaft 24 by a screw 51.

Figure 7:
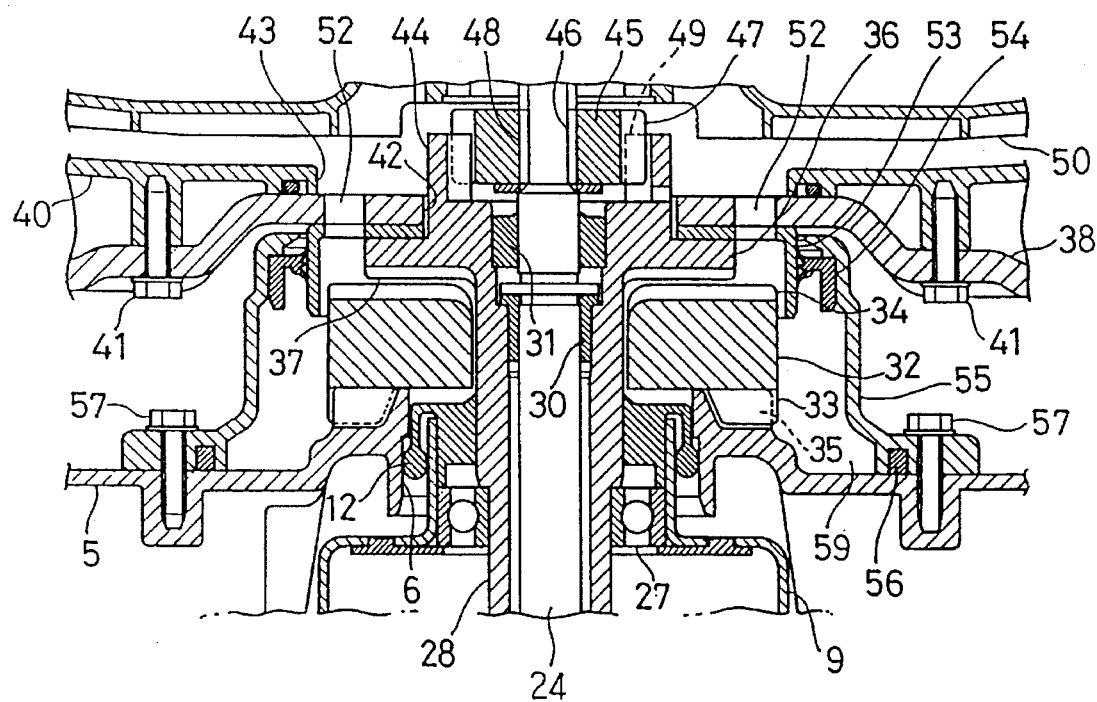
FIG. 7 is a view similar to FIG. 1, showing another section.

The support plate 38 has a plurality of small water passing holes 52 formed around the hole 42, as shown in FIG. 7. Seal rings 53 and seals 54 are attached to the underside of the support plate 38 so that the water passing holes 52 communicate with the interior of a water guide cover 55 which is secured to the bottom of the outer tub 5 by a plurality of bolts 57 with a seal 56 interposed therebetween. The interior of the water guide cover 55 communicates with a first drain hole 58 (FIG. 2) formed in a bottom margin of the outer tub 5, whereby the water guide cover 55 defines a water flow path 59 through which the inner tub 40 communicates with the first drain hole 58. The rotation restricting float 32 and the clutch float 45 are located in the water flow path 59. Spaces around the floats 32 and 45 substantially constitute float chambers 59a and 59b respectively. Each of the float chambers 59a and 59b is substantially contiguous with the water flow path 59.

An air trap 60 for detection of a water level is adjacent to the first drain hole 58 of the outer tub 5. The drain hole 58 and the air trap 60 communicate via a drain valve 61 with a drain hose 62. A second drain hole 63 directly communicating with the drain hose 62 is formed in another bottom margin of the outer tub 5 opposite the margin where the first drain hole 58 is formed, although the communication is not shown.

The inner tub 40 has a number of dehydrating openings or holes 64 formed only in the upper end portion thereof, as shown in FIG. 2. The dehydrating holes 64 are aligned in a single row along the circumference of the inner tub 40 in the embodiment. A balancing ring 65 is mounted to the upper end of the inner tub 40 so as to be located inside the dehydrating holes 64. A water passing space for the dehydration is defined between the balancing ring 65 and the upper circumferential portion of the inner tub 40 in which the dehydrating holes 64 are formed. An annular tub cover 66 is attached to the upper end of the outer tub 5. A top cover 67 is attached to the top of the outer cabinet 1 over the tub cover 66. A control device 68 serving as control means comprising a microcomputer, for example, is provided in the front interior of the top cover 67 while a water-supply device 69 comprising a water-supply valve 69a is provided in the rear interior or the top cover 67.

The automatic washing machine constructed as described above operates as follows under the control of the control device 68. In a wash step, water is supplied into the inner tub 40 by the water-supply device 69. The water supplied into the inner tub 40 flows through the water passing holes 52, the seal ring 53 and the water guide cover 55 or the water flow path 59 sequentially in this order, reaching the closed drain valve 61 through the first drain hole 58. The water level is gradually raised and the water flow path 59 is filled with the water. Finally, a previously set water level is reached in the inner tub 40.

Figure 8:
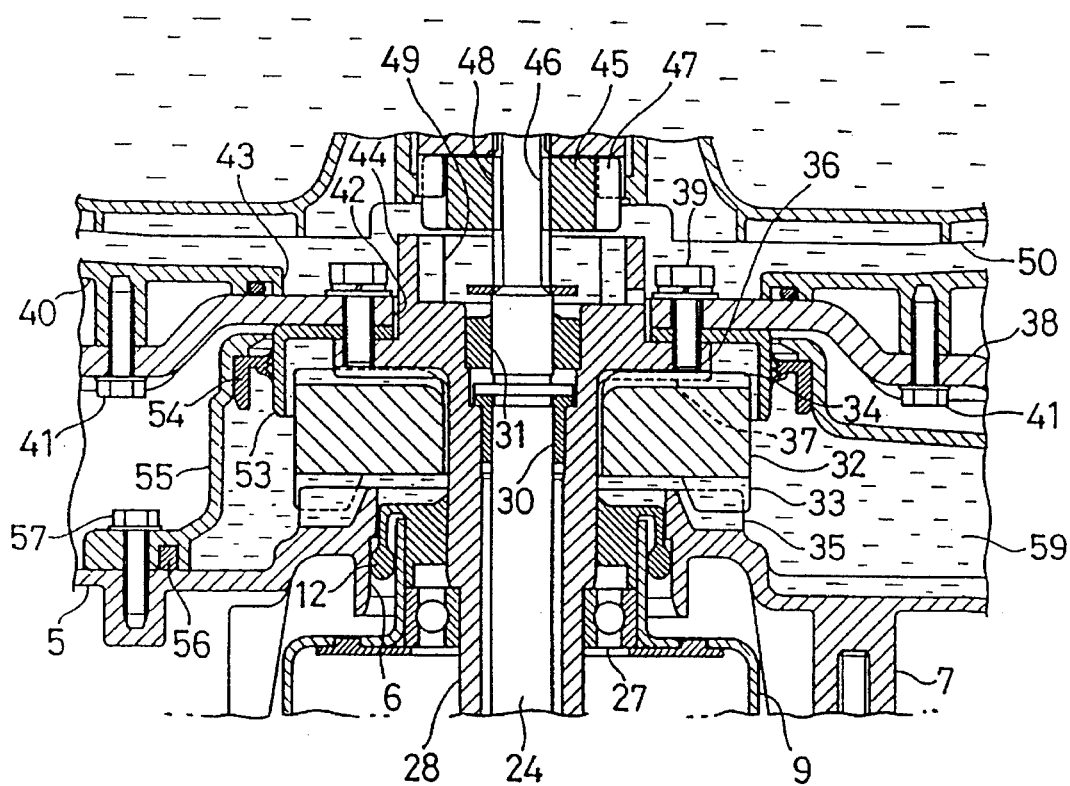
FIG. 8 is also a view similar to FIG. 1, showing the condition in the execution of a wash step.

When the water is reserved in the inner tub 40 as described above, the rotation restricting float 32 is caused to move upwardly and then, the clutch float 45 is caused to move upwardly in the water flow path 59, as shown in FIG. 8. Consequently, the upper gear teeth 34 of the float 32 are meshed with the gear teeth 37 of the external shaft 28 with its lower gear teeth 33 remaining in the mesh engagement with the gear teeth 35 of the outer tub 5. Thus, since the outer tub 5 is coupled not only to the external shaft 28 but also to the inner tub 40 mounted to the support plate 38 which is further mounted to the external shaft 28, free rotation of the inner tub 40 is restricted.

On the other hand, the external gear teeth 47 of the clutch float 45 are disengaged from the internal gear teeth 49 of the external shaft 28 with its internal gear teeth 46 remaining in the mesh engagement with the external gear teeth 48 of the shaft 24. Consequently, the clutch float 45 is released from the coupling thereof to the inner tub 40 such that the shaft 24 is decoupled from the inner tub 40. Accordingly, torque developed by the motor 13 is transmitted only to the agitator 50 secured to the shaft 24 but not to the inner tub 40, whereby only the agitator 50 is rotated. Rotation of the agitator 50 agitates the water and laundry previously put in the inner tub 40, so that the wash step is executed. Since rotation of the inner tub 40 is continuously restricted by the rotation restricting float 32, its rotation along with the agitator 50 is also prevented such that an agitating force of the agitator 50 effectively acts on the laundry and the water.

In a dehydration step, the drain valve 61 is opened so that the water in the inner tub 40 is discharged through the water flow path 59 and the drain hose 62. Consequently, the clutch float 45 and then the rotation restricting float 32 descend in turn. Accordingly, the external gear teeth 47 of the clutch float 45 are meshed with the internal gear teeth 49 of the external shaft 28 with its internal gear teeth 46 remaining in the mesh engagement with the external gear teeth 48 of the shaft 24. The clutch float 45 thus couples the shaft 24 to the inner tub 40.

With the downward movement of the rotation restricting float 32, the upper gear teeth 34 thereof are disengaged from the gear teeth 37 of the external shaft 28 while its lower gear teeth 33 remain in the mesh engagement with the gear teeth 35 of the outer tub 5. Consequently, the external shaft 28 is released from the coupling thereof to the outer tub 5 such that the inner tub 40 is released from the coupling thereof to the outer tub 5. Accordingly, the inner tub 40 is returned to the state of free rotation.

In the above-described state, the torque developed by the motor 13 is transmitted via the shaft 24 both to the agitator 50 and to the inner tub 40 via the clutch float 45 and the external shaft 28, whereby the agitator 50 and the inner tub 40 are rotated. A centrifugal force caused by rotation of the inner tub 40 squeezes the water out of the laundry. The squeezed water is caused to rise along the inner circumferential wall of the inner tub 40 and then discharged through the dehydrating holes 64 formed in the upper end of the inner tub 40. The discharged water is received by the inner circumferential wall of the outer tub 5, flowing downwardly and then being discharged out of the washing machine through the second drain hole 63 and the drain hose 62. In completion of the dehydration step, the inner tub 40 is stopped by dynamic braking of the motor 13.

According to the above-described embodiment, the power transmission is switched between the wash and dehydration steps by moving upwardly and downwardly the clutch float 45 provided around the shaft 24 rotated by the motor 13. The conventional clutch mechanism comprising clutch springs is not employed and the inner tub 40 is not caused to move upwardly and downwardly for the switching of the power transmission. Consequently, the clutch mechanism employed in the above-described washing machine has a simple construction and the parts do not require high precision. In particular, a large space defined over the inner tub 40 is not necessitated. Consequently, the laundry can be prevented from being caused to scatter out of the inner tub 40 through the space during the dehydrating operation. Furthermore, since the height of the washing machine is not increased, the laundry can be readily put into and taken out of the inner tub 40. Additionally, the inner tub 40 is secured to the flange 36 of the external shaft 28. Unlike the prior art construction in which the inner tub is caused to move upwardly, the inner tub 40 is not inclined and accordingly, occurrence of abnormal vibration due to the inclination during the dehydrating operation can be prevented.

The internal gear teeth 46 of the clutch float 45 are engaged with the external gear teeth 48 of the shaft 24 so that the clutch float 45 is rotated with the shaft 24 and is caused to move upwardly along the shaft 24. Consequently, since the clutch float 45 is allowed to move upwardly and downwardly in a better manner, power can be reliably transmitted from the shaft 24 to the clutch float 45. In engagement of the clutch float 45 with the shaft 24, a non-circular portion having a D-shaped section and a hole having a corresponding configuration may be provided instead of the gear teeth 46 and 48.

The external gear teeth 47 of the clutch float 45 are engaged with and disengaged from the internal gear teeth 49 of the external shaft 28 secured to the support plate 38 to which the inner tub 40 is also secured, so that the clutch float 45 is coupled to and decoupled from the inner tub 40. Consequently, power can be reliably transmitted from the clutch float 45 to the inner tub 40 and cut off in a short period of time corresponding to movement of the gear teeth by pitches.

The automatic washing machine as described above is provided with the rotation restricting float 32 which moves upwardly in the wash step to thereby couple the inner tub 40 to the outer tub 5 and which further decouples the inner tub 40 from the outer tub 5 under normal circumstances and in the dehydration step. Consequently, the inner tub 40 can be reliably prevented from being rotated in the wash step. The lower gear teeth 33 of the float 32 are in mesh engagement with the gear teeth 35 of the outer tub 5 so that the float 32 is movable upwardly and usually coupled to the outer tub 5. Furthermore, since the upper gear teeth 34 of the float 32 are engaged with and disengaged from the gear teeth 37, the inner tub 40 can be reliably prevented from being rotated and released from the prevented state while the float 32 is allowed to move upwardly and downwardly.

Furthermore, provision of both floats 32 and 45 can perform the switching of power transmission between the wash and dehydration steps, restriction of rotation of the inner tub 40 and the release of the inner tub 40 from the restricted state. Consequently, the construction of the clutch mechanism can be further simplified.

The dehydrating holes 64 are formed only in the upper circumferential wall of the inner tub 40. The water is reserved, in the wash step, in the water flow path 59 extending through the central bottom of the inner tub 40 to the first drain hole 58 of the outer tub 5. Since the water is not reserved in the outer tub 5, an amount of water used in the washing can be economized. Furthermore, since the rotation restricting float 32 and the clutch float 45 are provided in the water flow path 59, the switching of power transmission between the wash and dehydration steps can be performed without reduction in the water saving effect.

Figure 1:
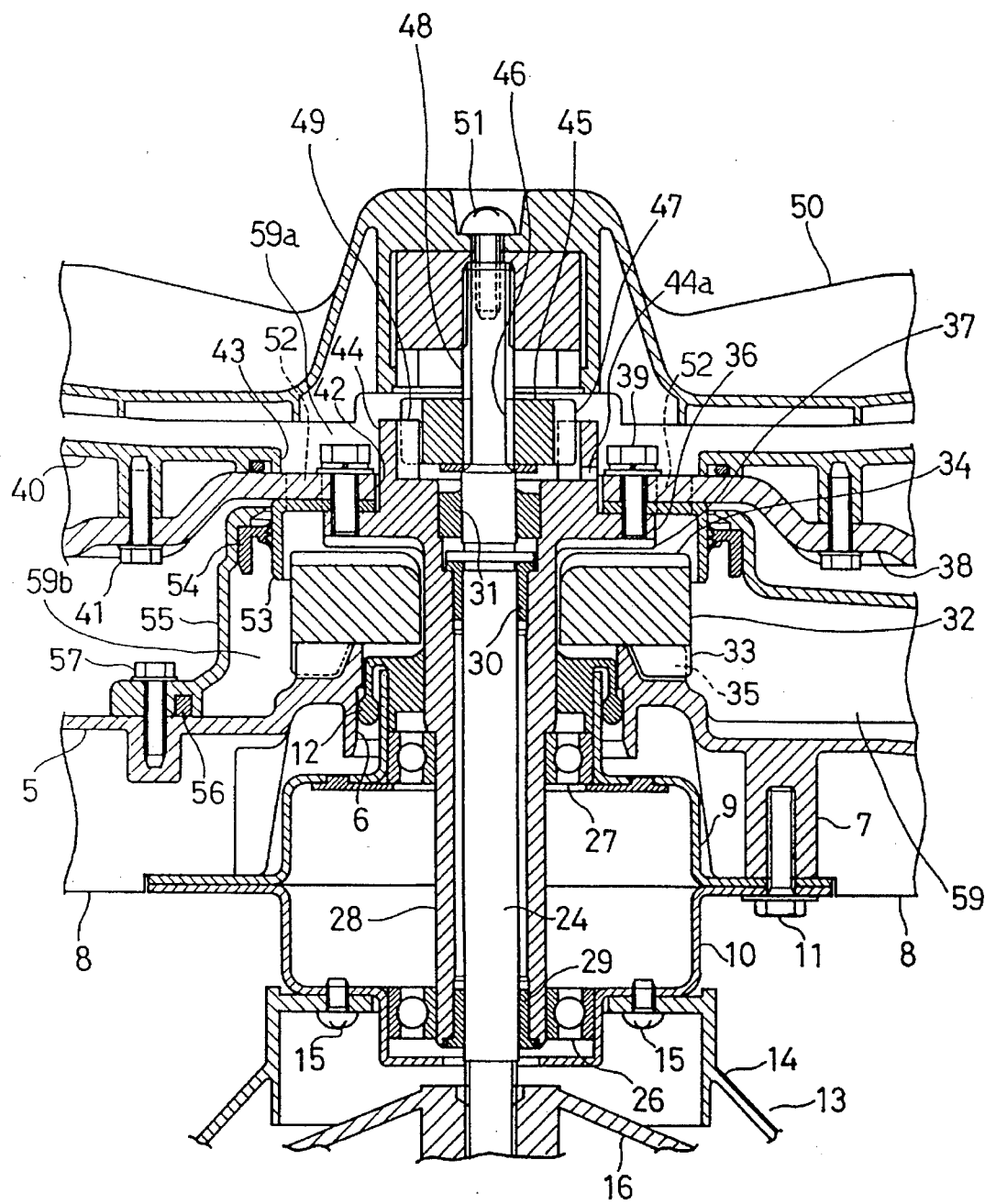
FIG. 1 is a longitudinal sectional view of a drive mechanism employed in an automatic washing machine of a first embodiment in accordance with the present invention.
Figure 9:
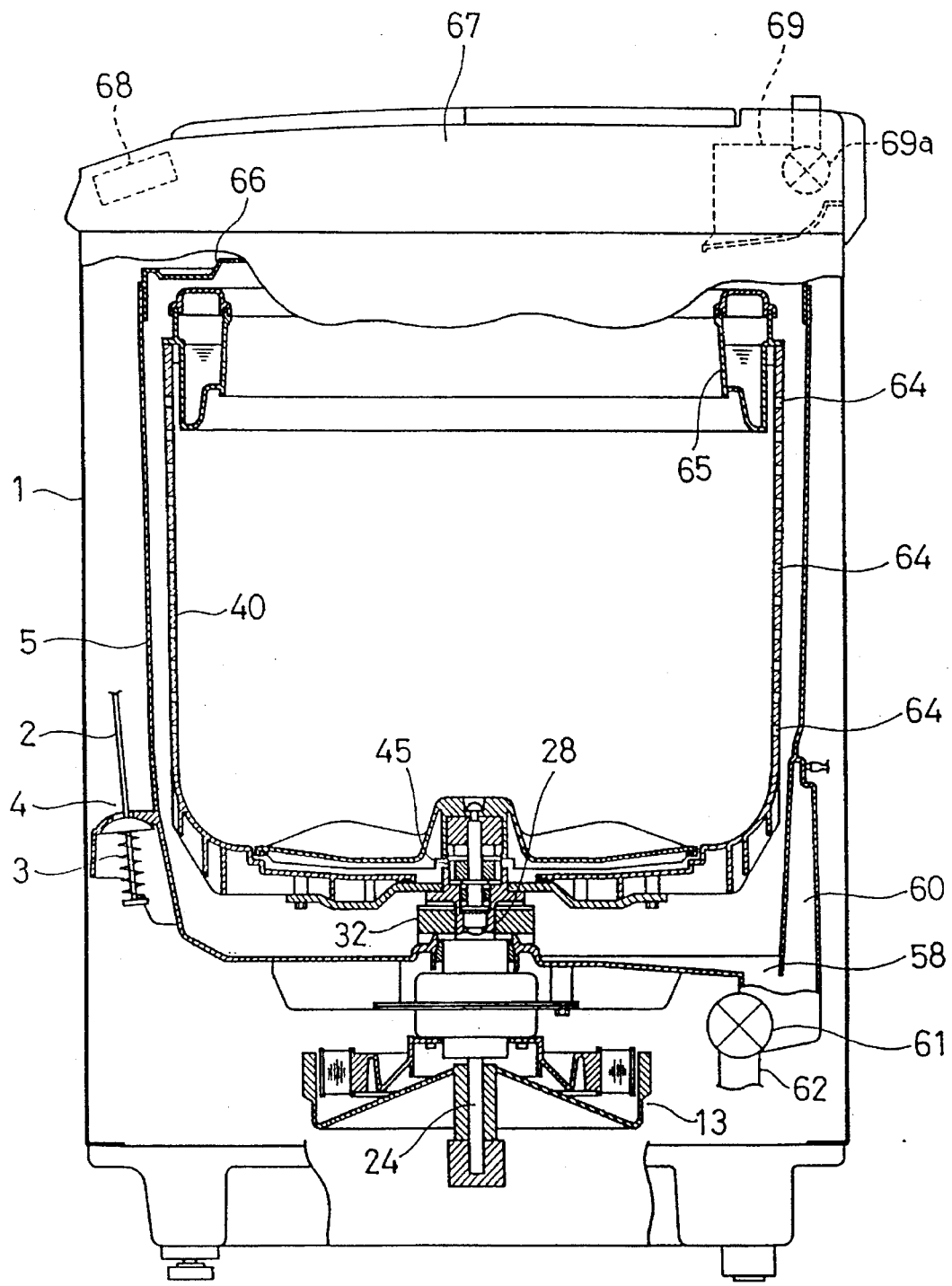
FIG. 9 is a view similar to FIG. 2, showing an automatic washing machine of a second embodiment in accordance with the present invention.

FIG. 9 illustrates a second embodiment of the present invention. The provision of the water flow path 59 and the second drain hole 63 both shown in FIG. 1 is eliminated in the second embodiment. Instead, the dehydrating holes 64 are formed in the whole circumferential wall of the inner tub 40 so that the water is reserved in the outer tub 5 as well as in the inner tub 40 in the wash step. The clutch float 45 and the rotation restricting float 32 are provided in the same manner as in the first embodiment.

Figure 10:
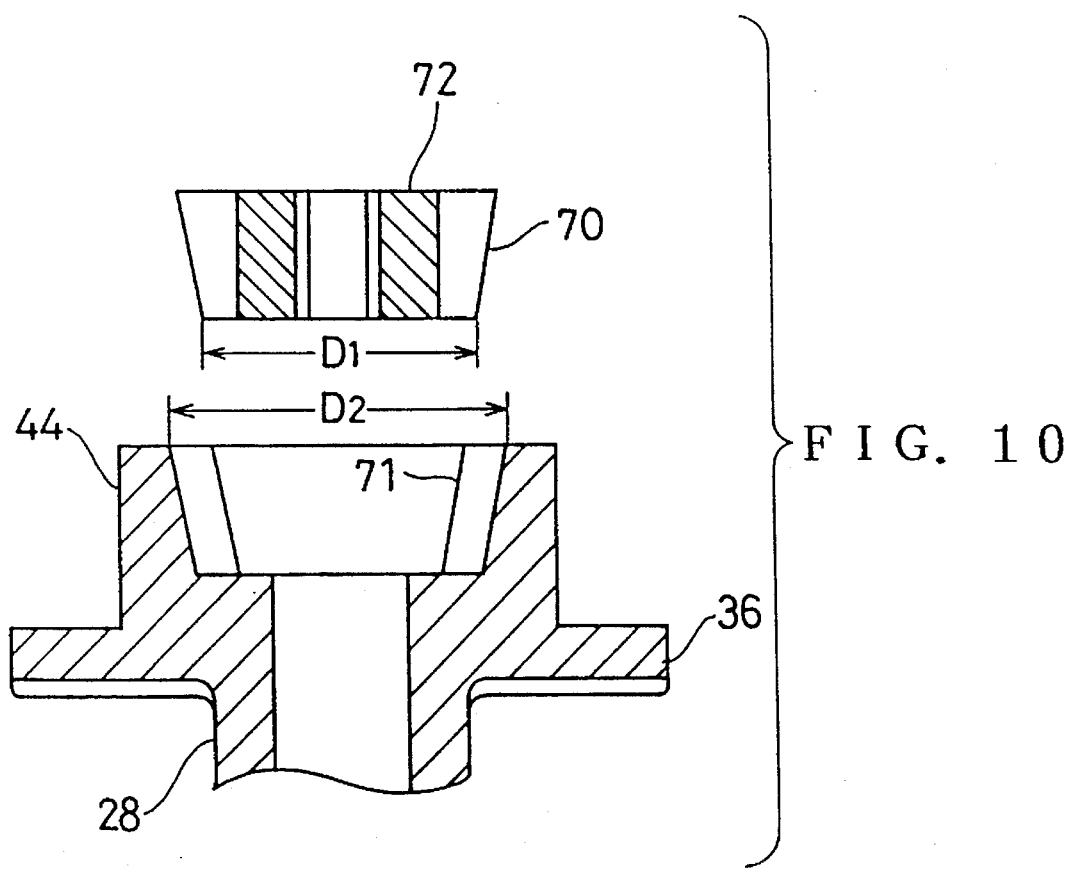
FIG. 10 is a view similar to FIG. 8, showing a modified form of the clutch float.

Referring to FIG. 10 showing a modified form of the clutch float, the clutch float 72 is formed into such a conical shape that the external gear teeth 70 thereof are tapered off toward the internal gear teeth 71 of the external shaft 28. In the case of the clutch float 72, particularly, the switching between power transmission to the external shaft 28 and cutoff of the power transmission thereto can be smoothly performed. Furthermore, the diameter D1 of a circle formed by the distal ends of the external gear teeth 70 is set to be smaller than the diameter D2 of an entrance of the conical internal gear teeth 71 of the external shaft 28 or the largest diameter end of the conical teeth 71. Consequently, the switching between power transmission to the external shaft 28 and cutoff of the power transmission thereto can be further smoothly performed.

The clutch floats 45 and 71 and the rotation restricting float 32 may be formed of a foamed plastic having a number of internal bubbles so that floatability of each of these parts can be improved.

Figure 11:
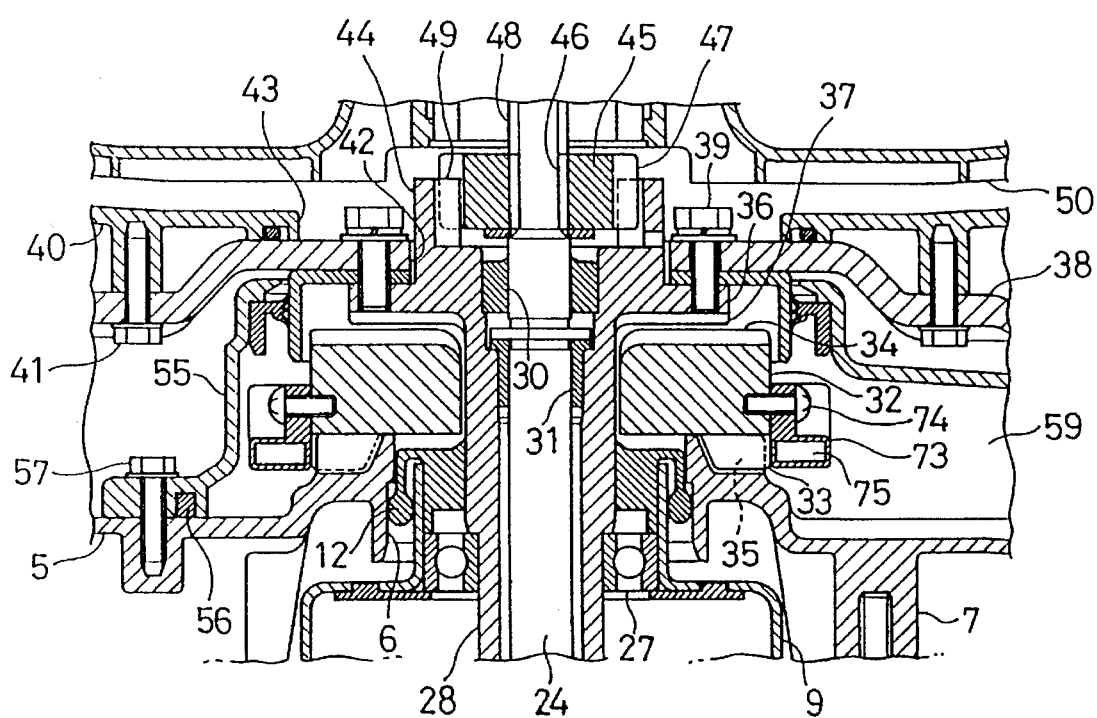
FIG. 11 is a view similar to FIG. 1, showing an automatic washing machine of a third embodiment in accordance with the present invention.
Figure 12:
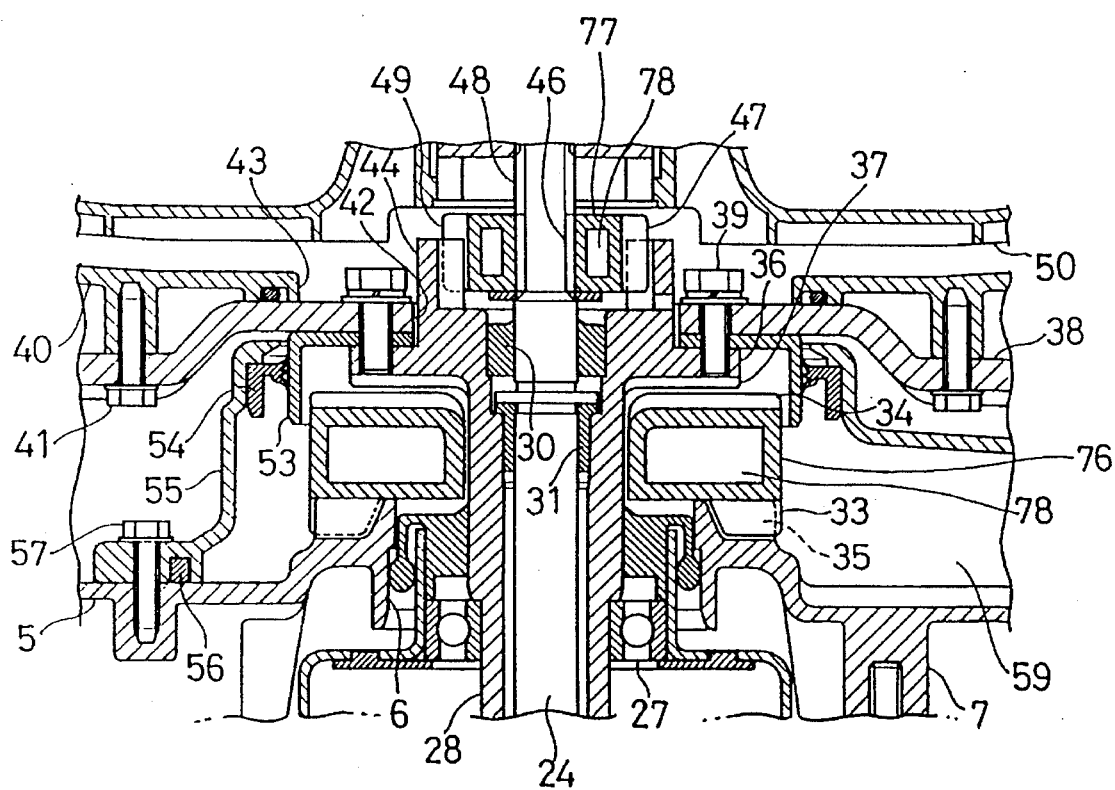
FIG. 12 is a view similar to FIG. 1, showing an automatic washing machine of a fourth embodiment in accordance with the present invention.

FIGS. 11 and 12 illustrate third and fourth embodiments of the invention respectively. In the third embodiment, a hollow sealed ring 73 having an air chamber 75 is mounted to the rotation restricting float 32 by screws 74. In the fourth embodiment, each of the rotation restricting float 76 and the clutch float 77 has an internal air chamber 78. In these embodiments, the buoyancy of the floats 32, 76 and 77 can be increased.

Figure 13:
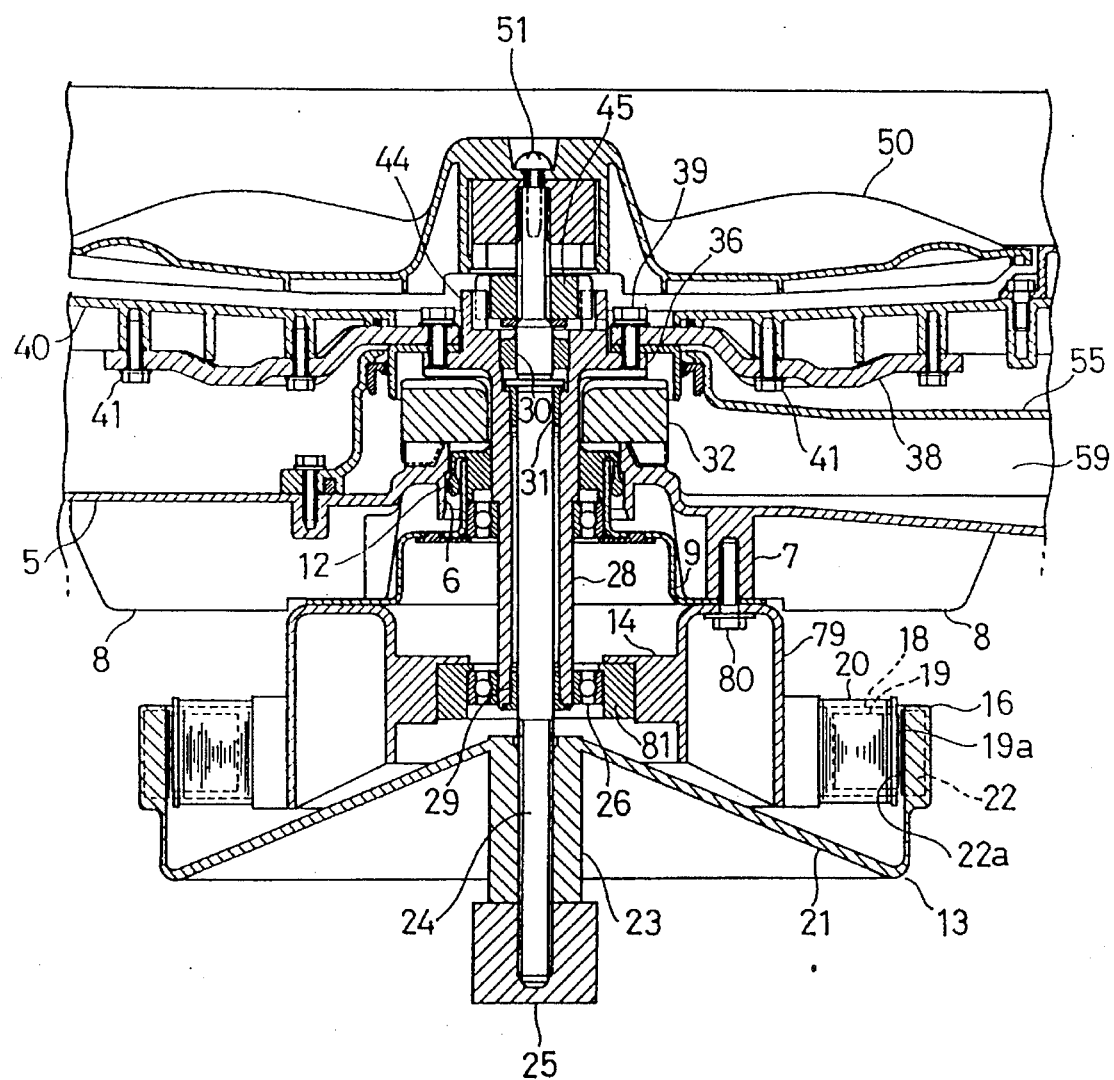
FIG. 13 is a view similar to FIG. 3, showing an automatic washing machine of a fifth embodiment in accordance with the present invention.

FIG. 13 illustrates a fifth embodiment of the invention. The motor 13 includes a stator base 79 formed of a plastic and directly mounted to the bosses 7 of the outer tub 5 by bolts 80 together with the upper bracket 9. The external shaft 28 is held at its lower portion via the lower ball bearing 26 on the stator base 79. The lower bracket 10 as shown in FIG. 1 may or may not be provided in this construction. An annular bush 81 formed of a material which is less thermally deformable than plastics, e.g., aluminum, is interposed between the stator base 79 and the lower ball bearing 26 by way of an insert molding, so that the bearing 26 can be reliably held.

Figure 14:
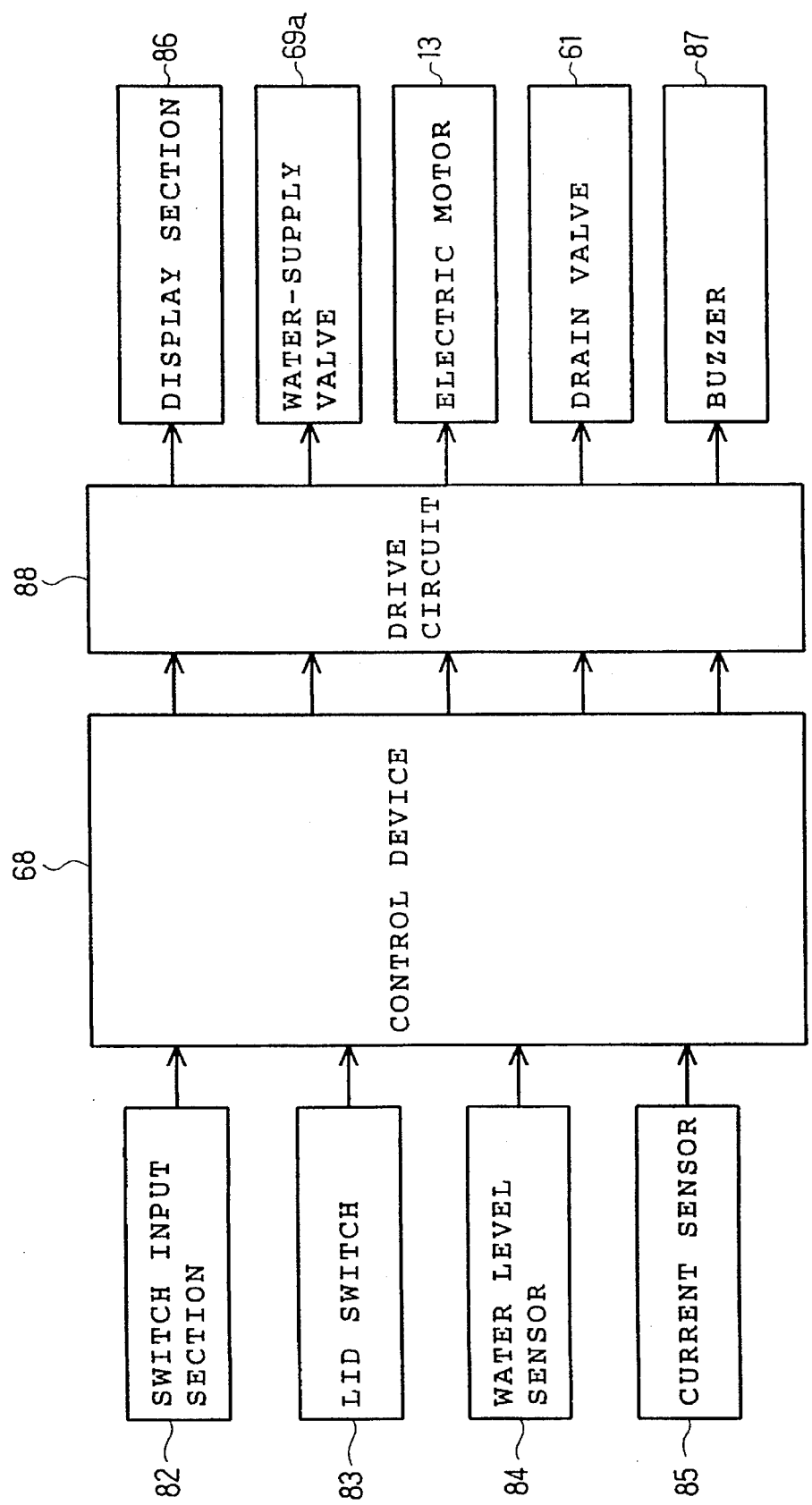
FIG. 14 is a block diagram showing an electrical arrangement of the automatic washing machine of the first embodiment.
Figure 15:
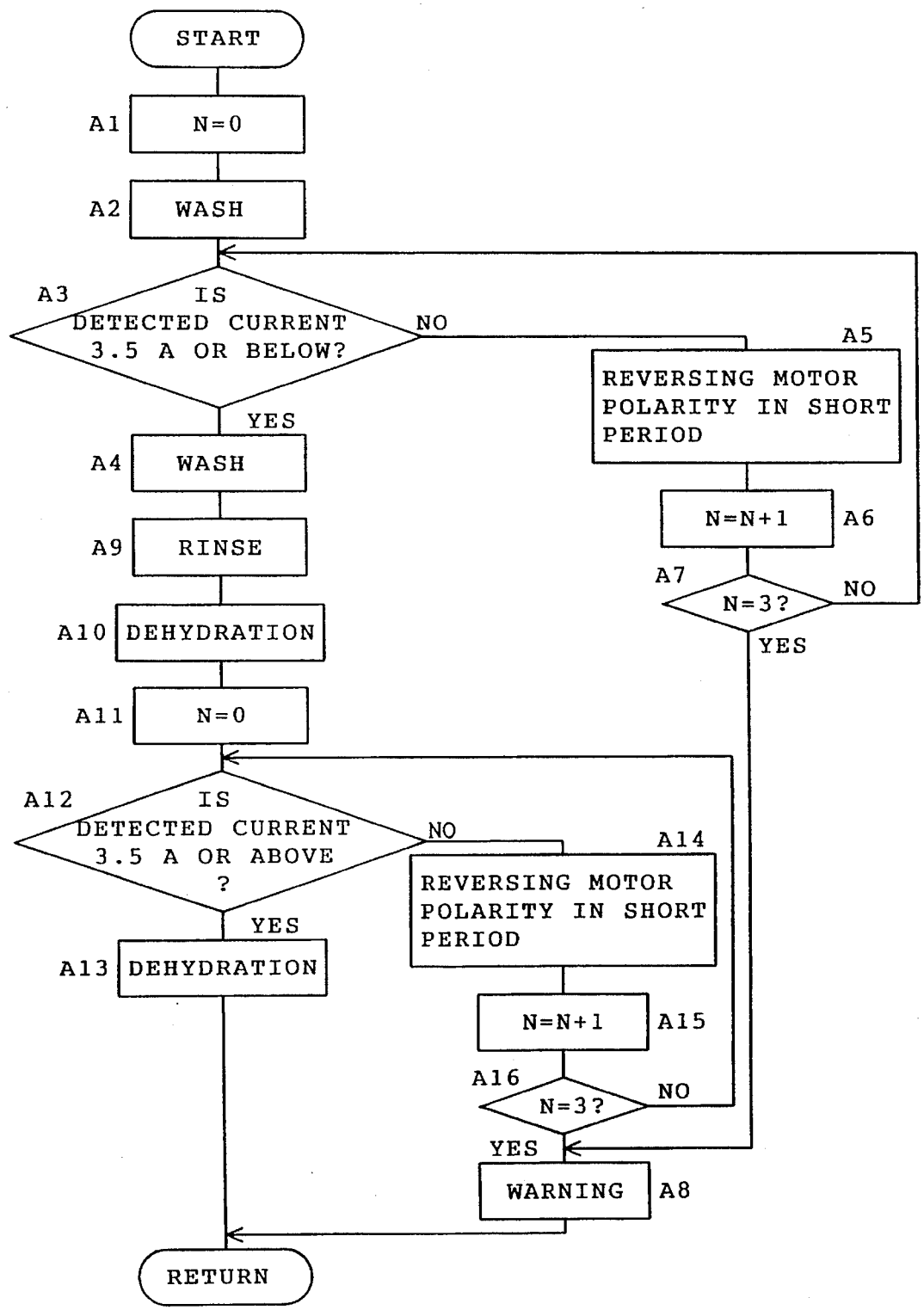
FIG. 15 is a flowchart explaining a control manner of a control device employed in the washing machine of the first embodiment.

FIG. 14 shows an electrical arrangement of the automatic washing machine of the first embodiment. FIG. 15 is a flowchart explaining a control manner of the control device 68. FIG. 16 shows the torque and current characteristic of the motor 13. Referring first to FIG. 14, the microcomputer based control device 68 is supplied with switch operation signals from a switch input section 82 comprising various operation switches and with a detection signal from a lid switch 83 detecting closure and opening of a lid 67a hingedly mounted on the top cover 67. The control device 68 is further supplied with a detection signal from a water level sensor 84 detecting a water level in the inner or outer tub 40 or 5 by the medium of the air trap 60 and with a current detection signal from a current sensor 85 serving as output producing means for producing an output in accordance with an amount of load applied to the motor 13 in each of the wash and dehydration steps. The current sensor 85 also serves as position detecting means for detecting the position of the clutch float 45 vertically moving.

Based on the above-described input signals and a previously stored control program, the control device 68 supplies control signals to a drive circuit 88 driving a display section 86 comprising various displays, the water-supply valve 69a of the water-supply device, the motor 13, the drain valve 61 and a buzzer 87 serving as a warning device, thereby controlling them in the following manner.

Referring to FIG. 15, the control device 68 initializes a count value N regarding occurrence of an abnormal position of the clutch float 45 upon supply of power thereto (step A1). Then, a wash step is initiated (step A2). Based on the input signals from the current sensor 85, the control device 68 then determines as to whether or not a drive current of the motor 13 is at a predetermined value, e.g. 3.5 A, or below (step A3). The drive current of the motor 13 takes different values depending upon the position of the clutch float 45 in the wash step. More specifically, on one hand, only the agitator 50 is rotated without simultaneous rotation of the inner tub 40 when the clutch float 45 has moved upwardly in the wash step such that its external gear teeth 47 are normally disengaged from the internal gear teeth 49 of the external shaft 28. Consequently, an amount of load applied to the motor 13 is small and the drive current of 3 A flows in the motor 13 as shown in FIG. 16. On the other hand, not only the agitator 50 but also the inner tub 40 are rotated when the external gear teeth 47 of the clutch float 45 are not normally disengaged from the internal gear teeth 49 of the external shaft 28 due to the sticking to the clutch float 45 of foreign matter such as lint or sand or for other reasons. Consequently, since the amount of load applied to the motor 13 is large, a drive current larger than the predetermined value, e.g. 4 A, flows in the motor 13.

The control device 68 thus determines as to whether or not the motor drive current is at 3.5 A or below in the wash step, thereby determining the position of the clutch float 45. The control device 68 determines that the clutch float 45 assumes a normal upper position, when the motor drive current is at 3.5 A or below. When the motor drive current exceeds the value of 3.5 A, the control device 68 determines that the clutch float 45 erroneously assumes a lower position.

The wash step is continuously executed (step A4) when the control device 68 determines at step A3 that the motor drive current is at 3.5 A or below and accordingly, that the clutch float 45 assumes the normal upper position. However, when it is determined that the motor drive current is above 3.5 A and accordingly, that the clutch float 45 assumes the lower position, the motor 13 is intermittently energized in a short period pattern wherein the motor 13 is energized for 0.4 seconds and deenergized for 0.3 seconds alternately repeatedly (step A5), which energization pattern differs from a normal energization pattern wherein the motor 13 is energized for 1.5 seconds and deenergized for 0.7 seconds alternately repeatedly. Since this intermittent energization in the short period pattern entails reversion of the polarity of the drive current, the rotation direction of the motor 13 is intermittently changed alternately between clockwise and counterclockwise directions.

The above-described change of the motor rotation direction applies vibration to the clutch float 45. Consequently, the cause for the abnormal position of the float 45 is eliminated when it is an ordinary one, whereupon the position of the float 45 can be corrected. Subsequently to step A5, the control device 68 adds "1" to the count value N regarding occurrence of the abnormal position of the clutch float 45 (step A6). The control device 68 then determines as to whether the count value N has reached a predetermined value, e.g. "3," indicating that the occurrence of the abnormal position of the float 45 has been counted three times (step A7), returning to step A3. When again determining at step A3 that the motor drive current is above 3.5 A, the control device repeats a loop of steps A5, A6, A7 and A3. The control device 68 activates the buzzer 87 for the warning (step A8) when the count value N has reached "3" (step A7) during repetition of the loop or when the short period reversion of rotation direction of the motor 13 is executed for correction of the position of the float 45 three times.

When determining at step A3 that the motor drive current is at 3.5 A or below, before reach of the count value N to "3," the control device 68 advances to step A4 and then to step A9 where a rinse step is executed. The above-described control for positional correction for the float 45 may or may not be performed during execution of the rinse step.

Thereafter, the control device 68 executes a dehydration step (step A10). The control device 68 initializes the count value N in the same manner as in step A1 (step A11) and then determines as to whether or not the motor drive current is at a predetermined value, e.g. 3.5 A, or above (step A12), on the basis of the input signals from the current sensor 85 (step A12). In the dehydration step, too, the drive current of the motor 13 takes different values depending upon the position of the clutch float 45. More specifically, on one hand, both of the agitator 50 and the inner tub 40 are rotated when the clutch float 45 has moved downwardly such that its external gear teeth 47 are normally engaged with the internal gear teeth 49 of the external shaft 28. Consequently, an amount of load applied to the motor 13 is large and the drive current of 4 A flows in the motor 13 as shown in FIG. 16. On the other hand, only the agitator 50 is rotated without simultaneous rotation of the inner tub 40 when the float 45 has insufficiently moved downwardly or remains at its upper position such that the external gear teeth 47 of the clutch float 45 are not engaged with the internal gear teeth 49 of the external shaft 28 due to the sticking to the clutch float 45 of foreign matter such as lint or sand or for other reasons. Consequently, since the amount of load applied to the motor 13 is small, a drive current smaller than 4 A, e.g. 3 A, flows in the motor 13. The control device 68 thus determines at step A12 as to whether or not the motor drive current is at 3.5 A or above, thereby determining the position of the clutch float 45. The clutch float 45 is determined to assume the normal lower position when the motor drive current is at 3.5 A or above while it is determined to assume the upper position when the motor drive current is below 3.5 A.

The dehydration step is continuously executed (step A13) when the control device 68 determines at step A12 that the motor drive current is at 3.5 A or above and accordingly, that the clutch float 45 assumes the normal lower position. However, when it is not determined that the motor drive current is at 3.5 A or above and accordingly, that the clutch float assumes the upper position, the motor 13 is intermittently energized in the short period pattern wherein the motor 13 is energized for 0.4 seconds and deenergized for 0.3 seconds alternately repeatedly (step A14) in the same manner as in step A5.

The above-described change of the motor rotation direction applies vibration to the clutch float 45. Consequently, the cause for the abnormal position of the float 45 is eliminated when it is an ordinary one, whereupon the position of the float 45 can be corrected.

Subsequently to step A14, the control device 68 executes steps A15 and A16 which are identical with steps A6 and A7 respectively, returning to step A12. When again determining at step A12 that the motor drive current is below 3.5 A, the control device 68 repeats a loop of steps A14, A15, A16 and A12. The control device 68 activates the buzzer 87 for the warning (step AS) when the count value N has reached "3" (step A16) during repetition of the loop. On the other hand, when determining at step A12 that the motor drive current is at 3.5 A or above, before reach of the count value N to "3," the control device 68 advances to step A13 and then completes the operation of the washing machine.

The wash and dehydration steps can be executed depending upon the actual position of the clutch float 45 by the above-described control manner. The detecting means for detecting an amount of load applied to the motor 13 or a load current serves as the output producing means for producing a determination signal regarding the position of the clutch float 45. Consequently, since the difference in the position of the clutch float in each of the wash and dehydration steps is distinctly indicated, the position of the clutch float 45 can be reliably determined. Furthermore, the rotation direction of the motor 13 is intermittently changed alternately between clockwise and counterclockwise directions when it is determined that the position of the clutch float 45 is not normal in each of the wash and dehydration steps. Since this reversion of the motor rotation direction produces a vibrating effect, the position of the clutch float 45 can be automatically corrected. In particular, since the above-described control for the correction of the position of the clutch float 45 is performed repeatedly at a plurality of times, the position of the clutch float 45 can be accurately corrected. Additionally, when it is determined that the position of the clutch float 45 is not normal in each of the wash and dehydration steps, the buzzer 87 is activated so that a user can be reliably informed of the abnormal condition of the clutch float 45.

Figure 17:
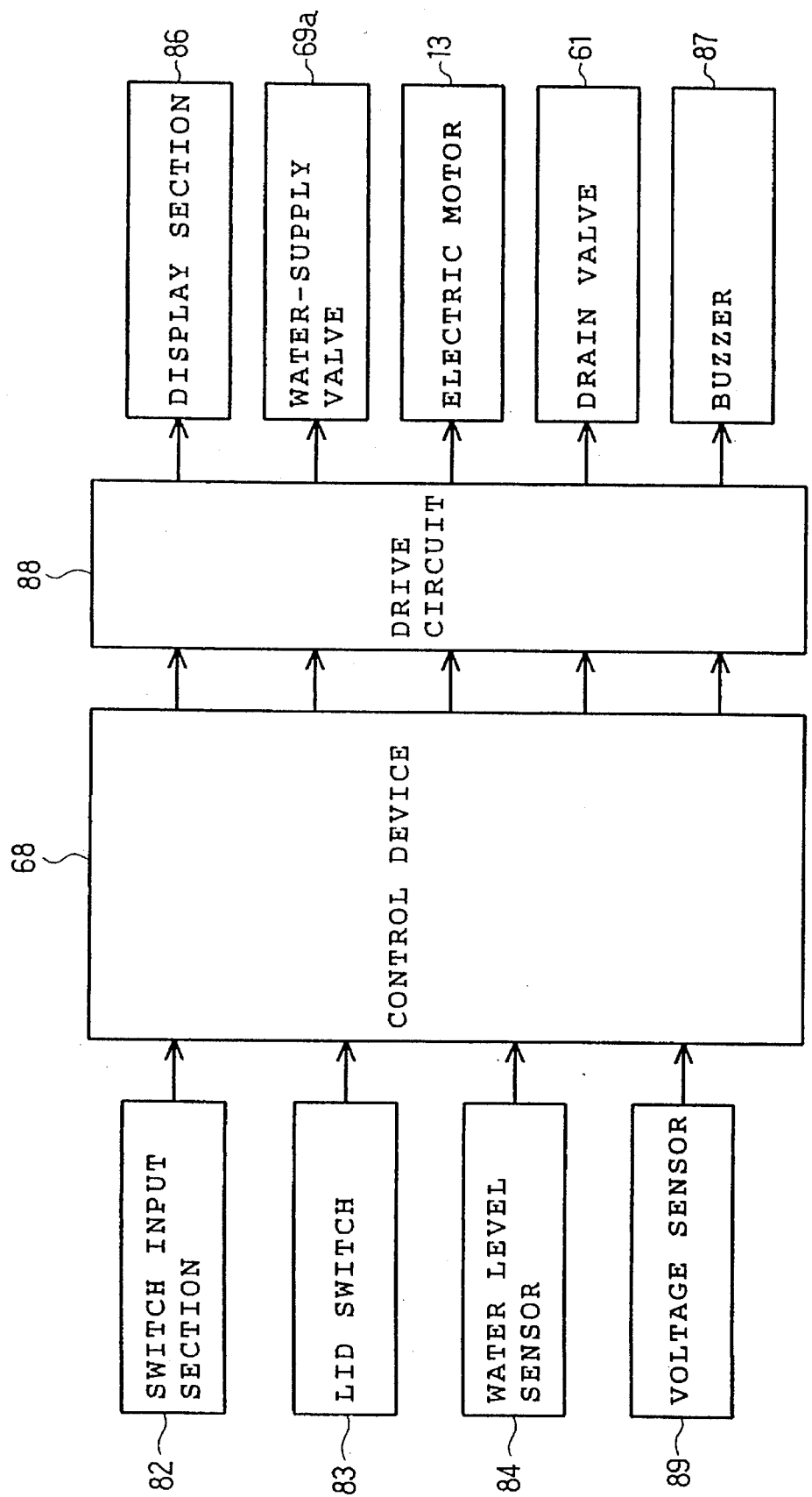
FIG. 17 is a block diagram showing an electrical arrangement of an automatic washing machine of a sixth embodiment in accordance with the present invention.
Figure 18:
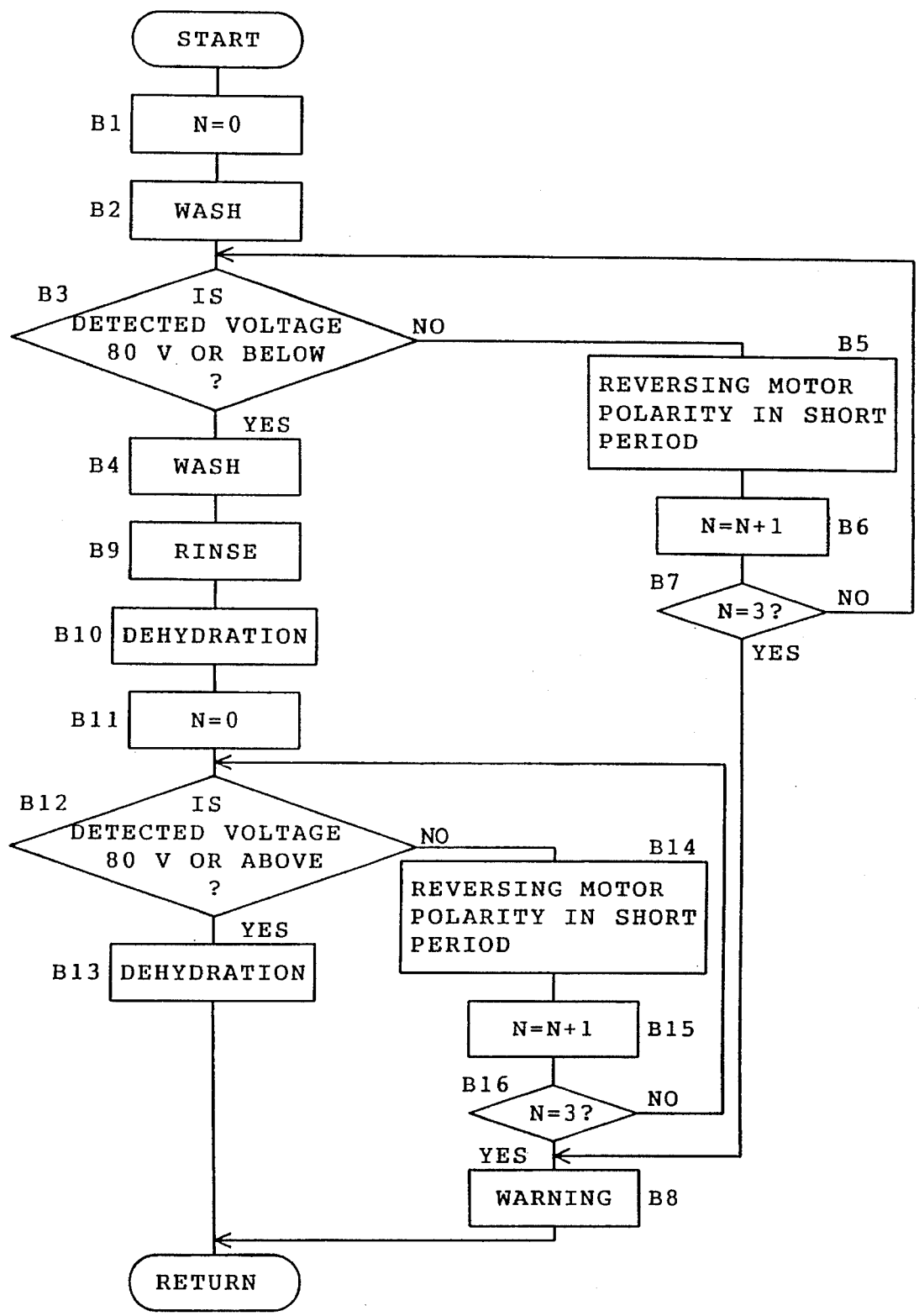
FIG. 18 is a flowchart explaining a control manner of the control device employed in the washing machine of the sixth embodiment.
Figure 20:
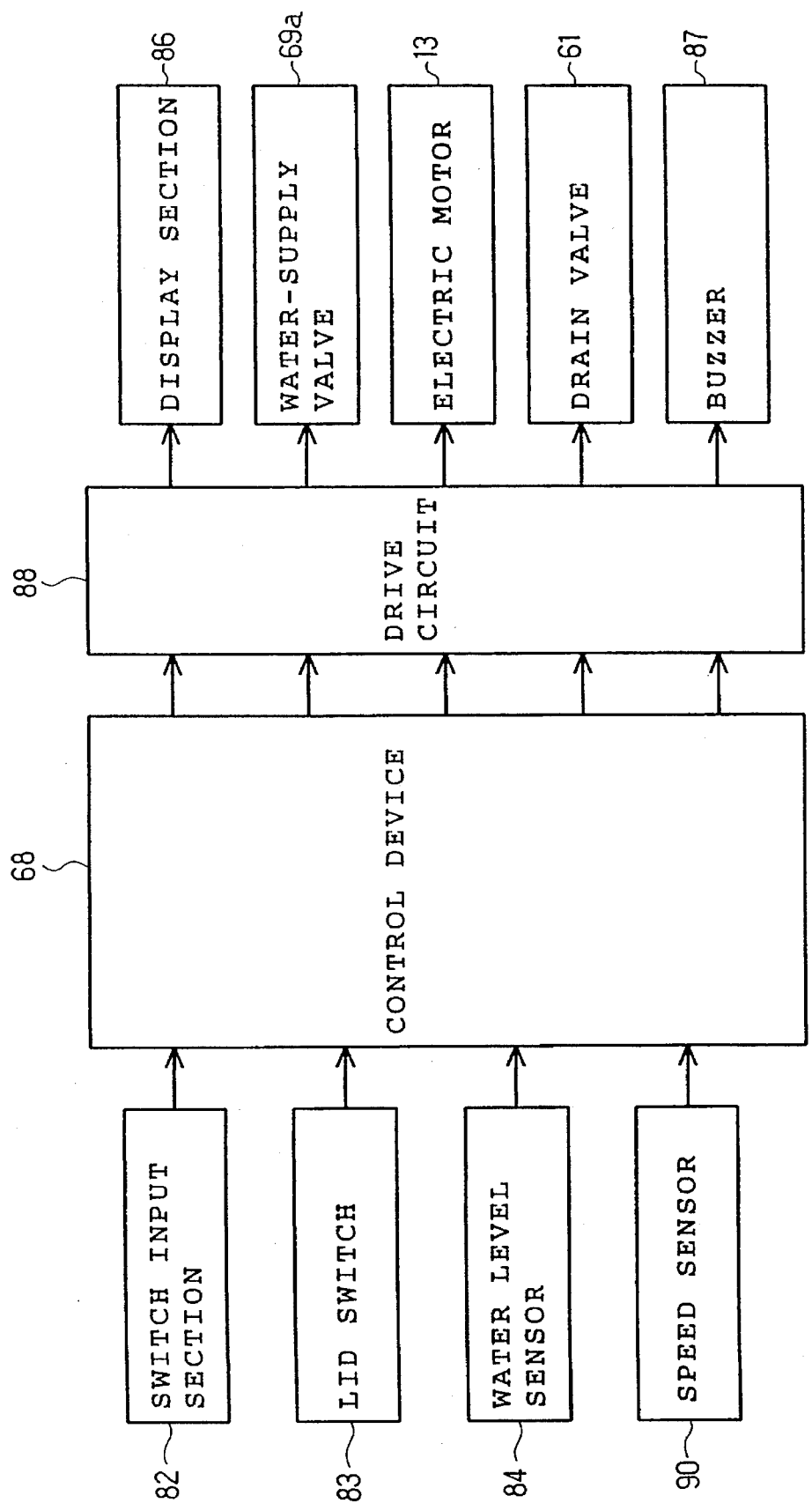
FIG. 20 is an electrical block diagram showing an electrical arrangement of an automatic washing machine of a seventh embodiment in accordance with the present invention.

FIG. 17 shows an electrical arrangement of the automatic washing machine of the sixth embodiment. FIG. 18 is a flowchart explaining a control manner of the control device 68 in the sixth embodiment. FIG. 19 shows the speed and torque characteristics of the motor employed in the washing machine of the sixth embodiment. A voltage sensor 89 is provided as the position detecting means for detecting the position of the clutch float 45 in each of the wash and dehydration steps, instead of the above-described current sensor 85. An output of the voltage sensor 89 or a voltage detection signal is supplied to the control device 68. The provision of the voltage sensor 89 depends upon the fact that the motor 13 is a variable speed motor.

Based on the input signal from the voltage sensor 89, the control device 68 determines as to whether or not the detected voltage value is a predetermined value such as 80 V or below, at step B3 corresponding to step A3 in FIG. 15. At step B12 corresponding to step A12, the control device 68 determines as to whether or not the detected voltage value is 80 V or above. Only the agitator 50 is rotated without simultaneous rotation of the inner tub 40 when the clutch float 45 has moved upwardly in the wash step such that its external gear teeth 47 are normally disengaged from the internal gear teeth 49 of the external shaft 28. Consequently, an amount of load applied to the motor 13 is small. The control device 68 determines the amount of motor load to thereby apply a voltage of 70 V to the motor 13 as shown in FIG. 19. Not only the agitator 50 but also the inner tub 40 are rotated when the external gear teeth 47 of the clutch float 45 are not normally disengaged from the internal gear teeth 49 of the external shaft 28. Consequently, since the amount of load applied to the motor 13 is large, the control device 68 determines that a voltage which is equal to or larger than 70 V, e.g. 90 V, needs to be applied to the motor 13. The control device 68 thus determines at step B3 as to whether or not the value of voltage applied to the motor 13 is 80 V or below, thereby determining the position of the clutch float 45. The control device 68 determines that the clutch float 45 assumes a normal upper position, when the applied voltage value is 80 V or below. When the applied voltage value is above 80 V, the control device 68 determines that the clutch float 45 erroneously assumes a lower position.

In the dehydration step, both of the agitator 50 and the inner tub 40 are rotated when the clutch float 45 has moved downwardly such that its external gear teeth 47 are normally engaged with the internal gear teeth 49 of the external shaft 28. Consequently, since an amount of load applied to the motor 13 is large, the control device 68 determines that a voltage of 90 V needs to be applied to the motor 13 as shown in FIG. 19. However, only the agitator 50 is rotated without simultaneous rotation of the inner tub 40 when the float 45 has insufficiently moved downwardly or remains at its upper position such that the external gear teeth 47 of the clutch float 45 are not engaged with the internal gear teeth 49 of the external shaft 28. Consequently, since the amount of load applied to the motor 13 is small, a voltage whose value is equal to or below the above-mentioned value, e.g. 70 V, is applied to the motor 13. The control device 68 thus determines at step B12 as to whether or not the voltage applied to the motor 13 is at 80 V or above, thereby determining the position of the clutch float 45. The clutch float 45 is determined to assume the normal lower position when the applied voltage is at 80 V or above while it is determined to erroneously assume the upper position when the applied voltage is below 80 V. Steps B1, B2, B4 to B11 and B13 to B16 in FIG. 18 are identical with steps A1, A2, A4 to A11 and A13 to A16 in FIG. 15 respectively and accordingly, the same effect can be achieved in the sixth embodiment as in the first embodiment.

Figure 21:
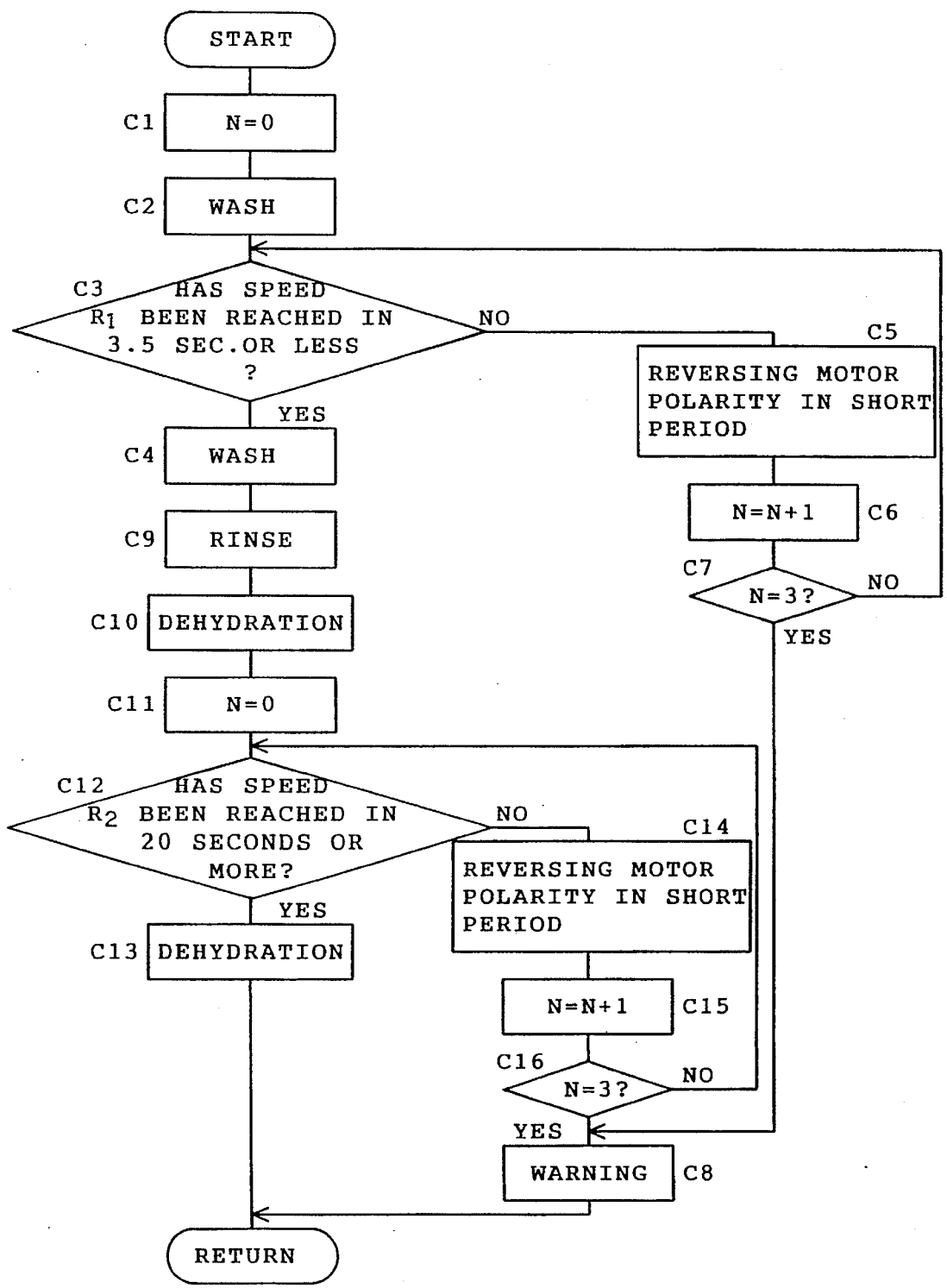
FIG. 21 is a flowchart explaining a control manner of the control device employed in the washing machine of the seventh embodiment.
Figure 22:
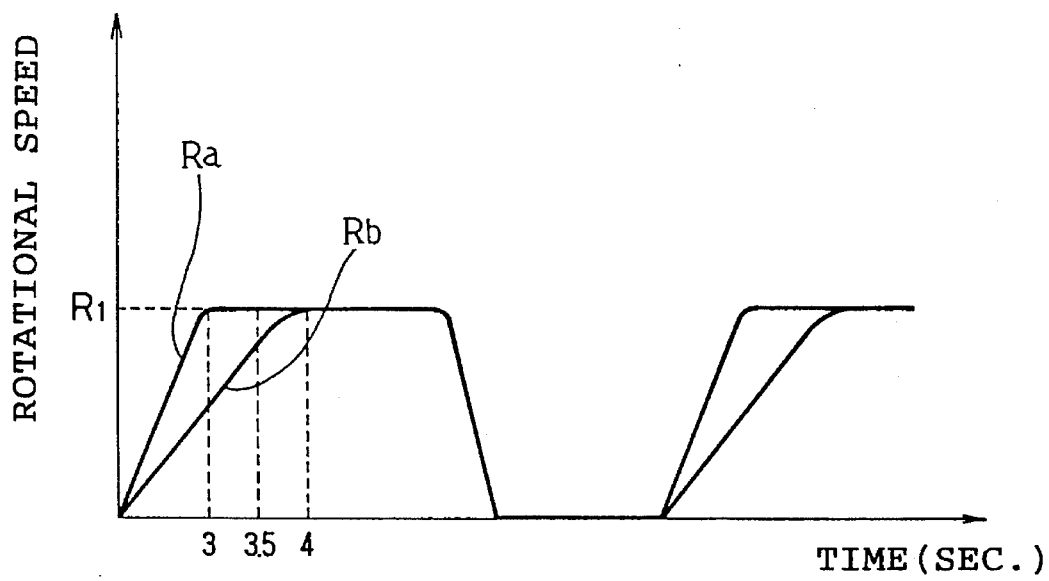
FIG. 22 is a graph showing speed rise characteristics of the motor in a wash step.

FIGS. 20 to 23 illustrate a seventh embodiment of the invention. In the seventh embodiment, a speed sensor 90 is employed as the means for detecting the position of the clutch float 45 in the wash and dehydration steps, and output of the speed sensor 90 is input to the control device 68. Based on a speed detection signal from the speed sensor 90, the control device 68 determines at step C3 as to whether or not it has taken 3.5 seconds or below for the speed of the motor 13 to be increased from zero to speed $R_1$. Furthermore, at step C12, the control device 68 determines as to whether or not it has taken 20 seconds or above for the motor speed to be increased from zero to speed $R_2$. On one hand, only the agitator 50 is rotated without simultaneous rotation of the inner tub 40 when the clutch float 45 has moved upwardly in the wash step such that its external gear teeth 47 are normally disengaged from the internal gear teeth 49 of the external shaft 28. Consequently, an amount of load applied to the motor 13 is small. FIG. 22 shows speed rise characteristics of the motor 13 in the wash step. As shown by curve $R_a$, it takes 3 seconds for the motor speed to be increased from zero to speed $R_1$. On the other hand, not only the agitator 50 but also the inner tub 40 are rotated when the external gear teeth 47 of the clutch float 45 are not normally disengaged from the internal gear teeth 49 of the external shaft 28 in the wash step. Accordingly, it takes, for example, 4 seconds for the motor speed to be increased from zero to speed $R_1$ as shown by curve $R_b$ in FIG. 22. The control device 68 thus determines at step C3 as to whether or not it has taken 3.5 seconds or below for the speed of the motor 13 to be increased from zero to speed $R_1$, thereby determining the position of the clutch float 45. The clutch float 45 is determined to normally assume the upper position when it has taken 3.5 seconds or below. When it has taken more than 3.5 seconds, the clutch float 45 is determined to erroneously assume the lower position.

Figure 23:
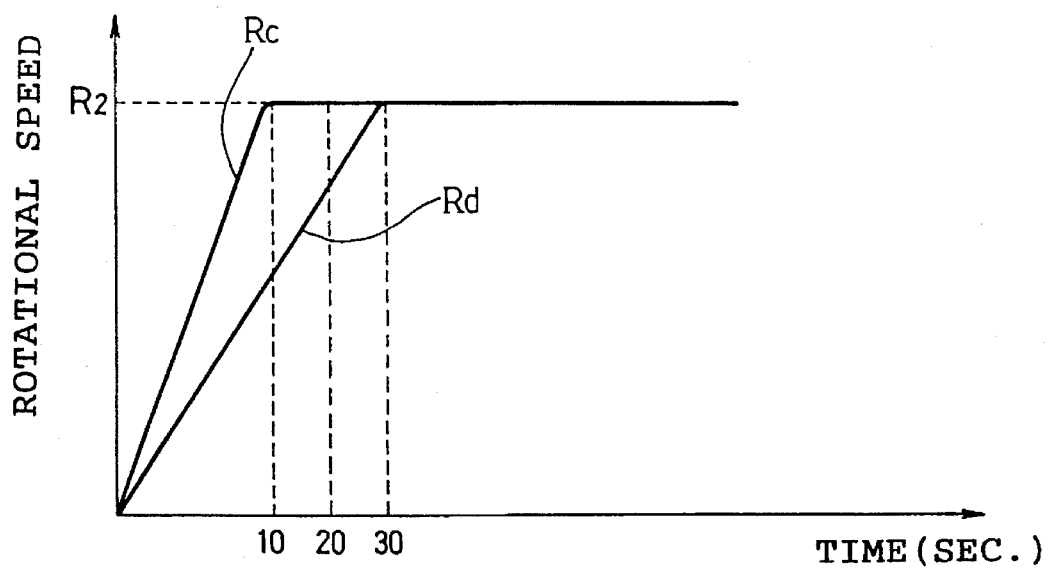
FIG. 23 is a graph showing speed rise characteristics of the motor in a dehydration step.

In the dehydration step, both of the agitator 50 and the inner tub 40 are rotated when the clutch float 45 has descended such that its external gear teeth 47 are normally engaged with the internal gear teeth 49 of the external shaft 28. Consequently, an amount of load applied to the motor 13 is large. FIG. 23 shows speed rise characteristics of the motor 13 in the dehydration step. As shown by curve $R_d$ in FIG. 23, it takes 30 seconds for the motor speed to be increased from zero to speed $R_2$. On the other hand, only the agitator 50 is rotated without simultaneous rotation of the inner tub 40 when the float 45 has insufficiently moved downwardly or remains at its upper position such that the external gear teeth 47 of the clutch float 45 are not engaged with the internal gear teeth 49 of the external shaft 28. Consequently, the amount of load applied to the motor 13 is small. Accordingly, it takes a period equal to the above-described one or below, for example, 10 seconds for the motor speed to be increased from zero to speed $R_2$ as shown by curve $R_c$ in FIG. 23. The control device 68 thus determines at step C12 as to whether or not it has taken 20 seconds or above for the speed of the motor 13 to be increased from zero to speed $R_2$, thereby determining the position of the clutch float 45. The clutch float 45 is determined to normally assume the upper position when it has taken 20 seconds or above. When it has taken less than 20 seconds, the clutch float 45 is determined to erroneously assume the lower position. Steps C1, C2, C4 to C11 and C13 to C16 in FIG. 21 are identical with steps A1, A2, A4 to A11 and A13 to A16 in FIG. 15 respectively and accordingly, the same effect can be achieved in the seventh embodiment as in the first embodiment.

Figure 24:
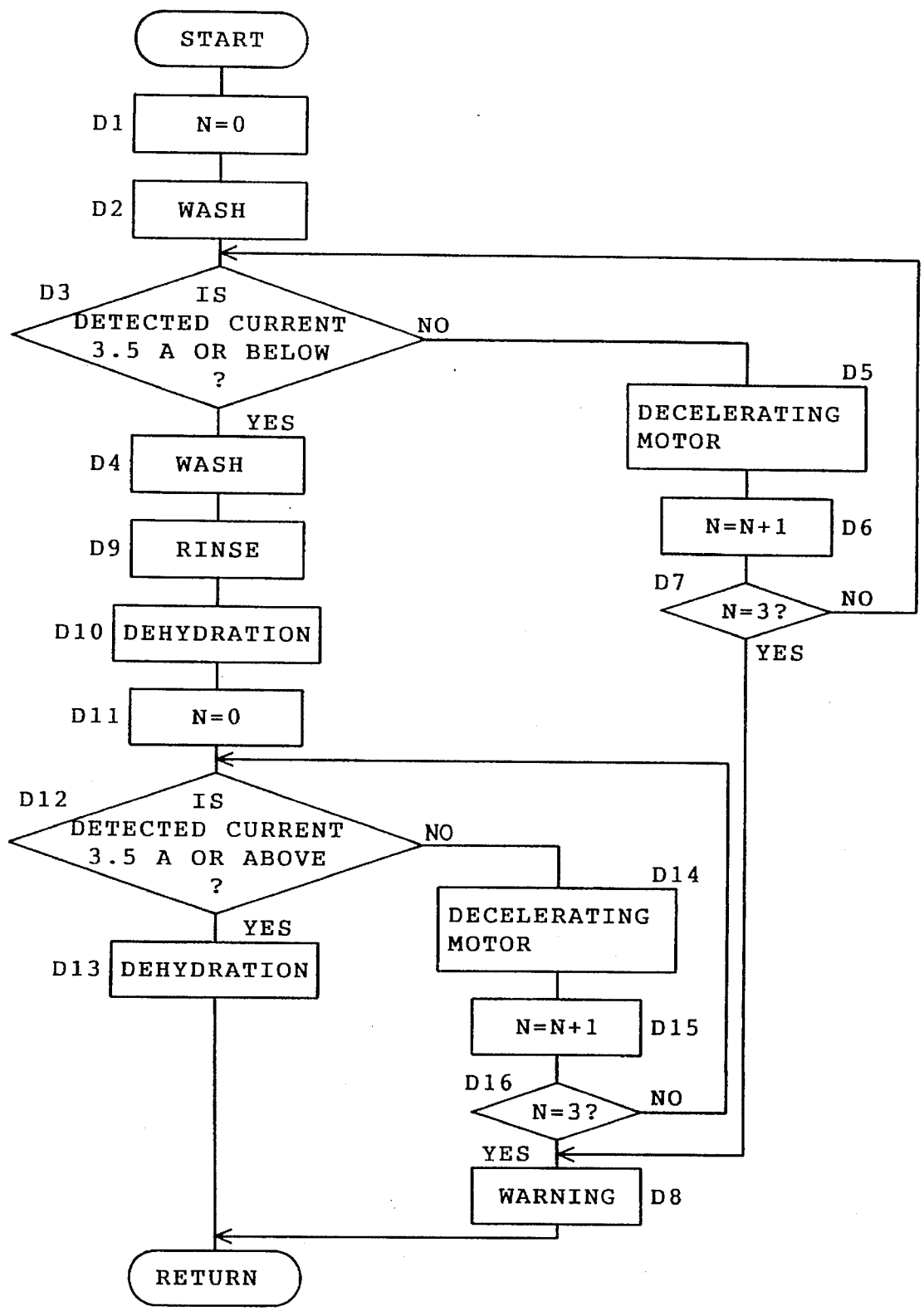
FIG. 24 is a flowchart explaining a control manner of the control device employed in the automatic washing machine of an eighth embodiment in accordance with the present invention.

FIG. 24 illustrates an eighth embodiment of the invention. The motor speed is reduced at steps D5 and D14. More specifically, the speed of the motor 13 is usually in a range of 145 to 180 rpm in the wash step. At step D5, the motor speed is temporarily reduced to a range of 70 to 100 rpm, and the motor runs in this speed range for a predetermined short period of time. Furthermore, the motor speed is temporarily reduced from a usual dehydrating speed to a range of 70 to 100 rpm in the dehydration step, and the motor 13 runs in this speed range for a predetermined short period of time. As the result of the above-described temporary reduction of the motor speeds, the clutch float 45 is shocked such that the external gear teeth 47 thereof are easily disengaged from the internal gear teeth 49 of the external shaft 28 at step D5 and such that the external gear teeth 47 are easily engaged with the internal gear teeth 49 at step D14.

Although steps D3 and D12 are identical with steps A3 and A12 respectively, they may be identical with steps B3 and B12 or steps C3 and C12, respectively. Steps D1, D2, D4 to D11, D13, D15 and D16 in FIG. 24 are identical with the corresponding steps in FIGS. 15, 18 and 21.

Figure 25:
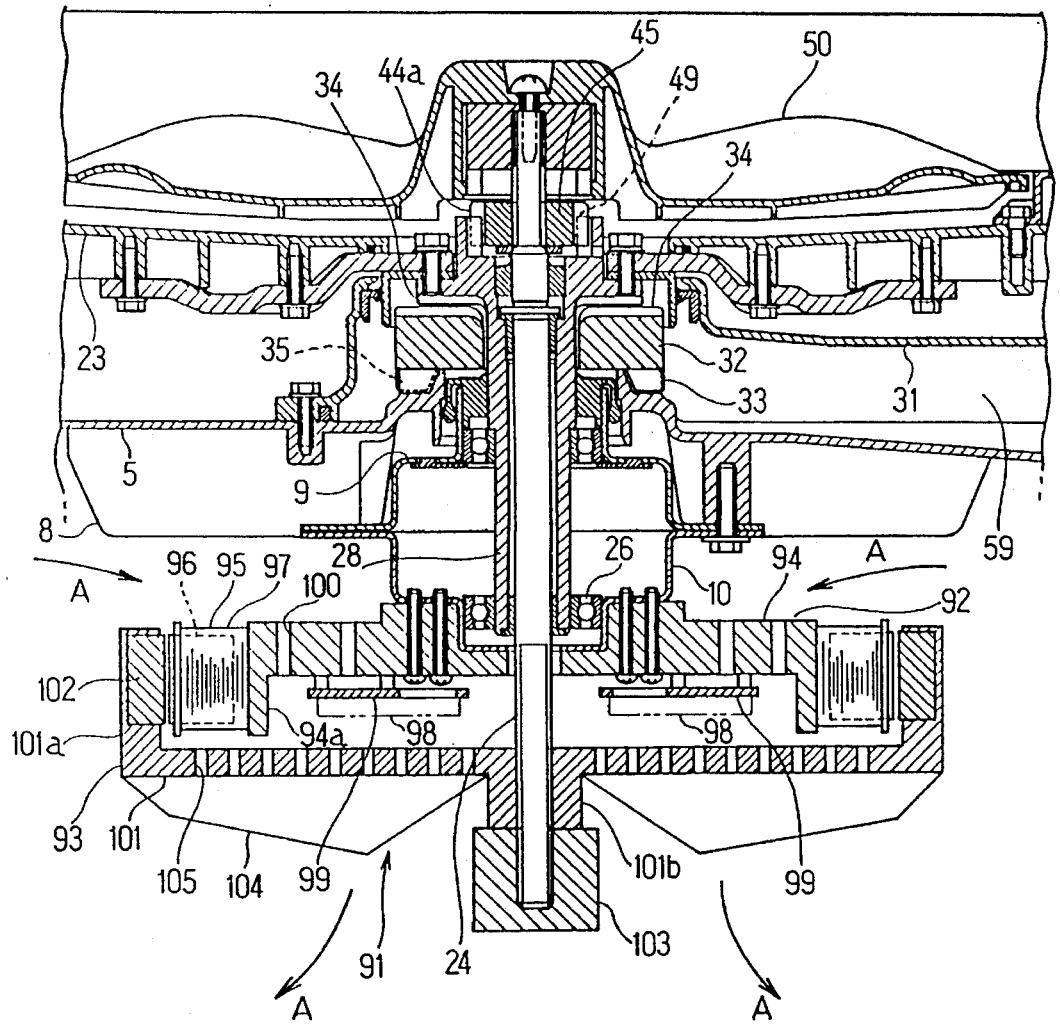
FIG. 25 is a longitudinal sectional view of a motor and clutch mechanism employed in an automatic washing machine of a ninth embodiment in accordance with the present invention.
Figure 26:
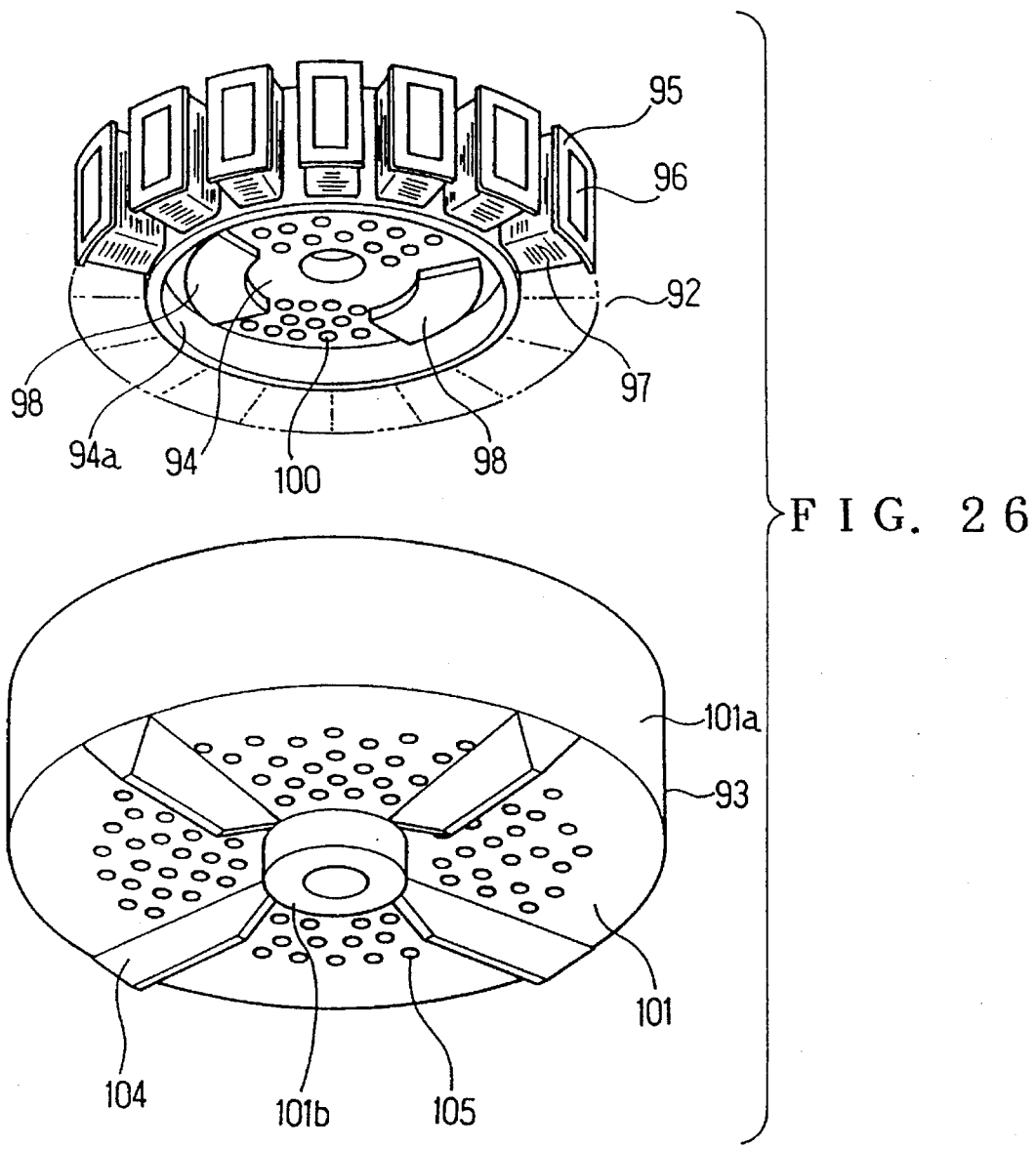
FIG. 26 is an exploded perspective view of the motor shown in FIG. 25.
Figure 27:
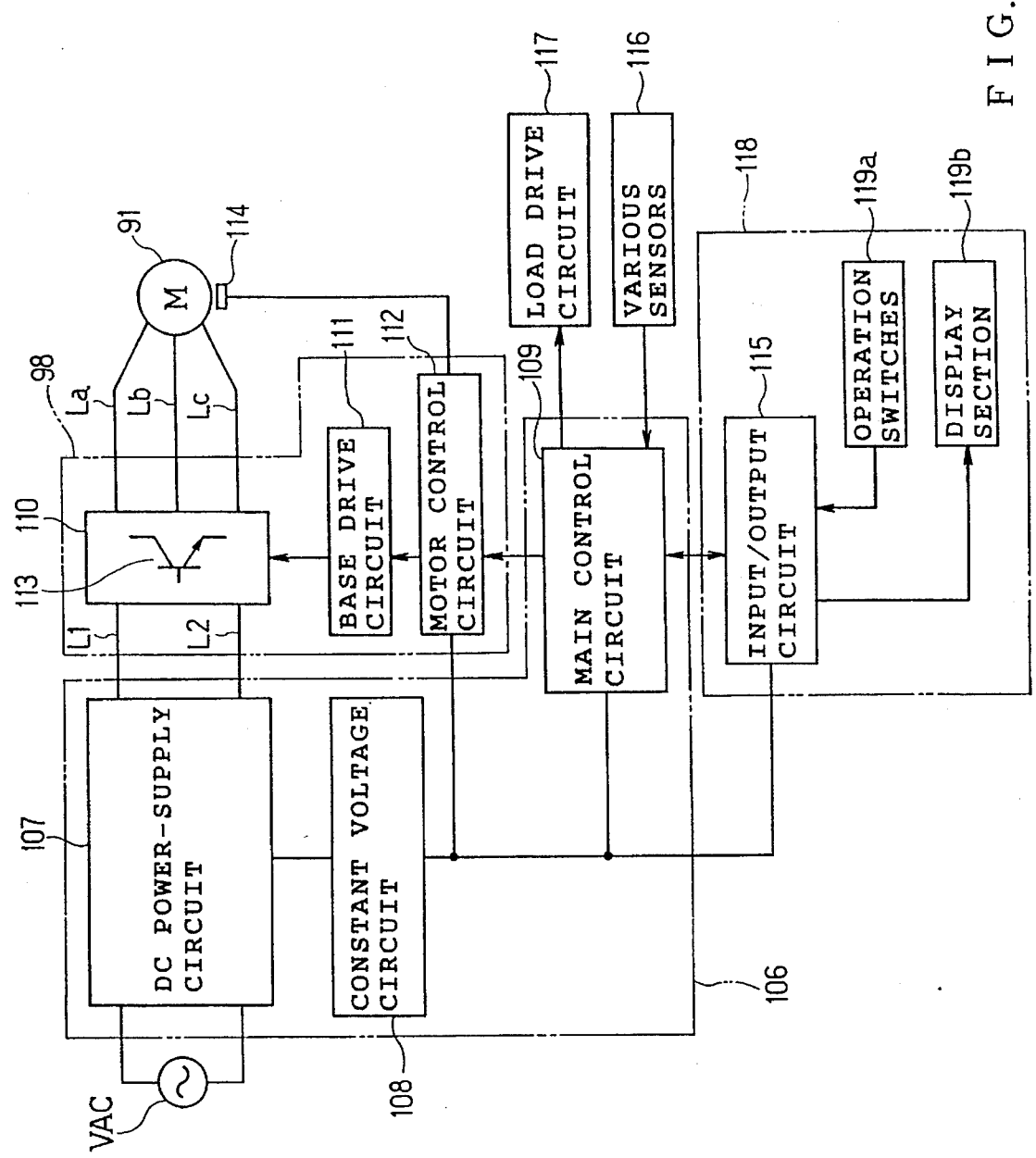
FIG. 27 is a block diagram showing an electrical arrangement of the washing machine of the ninth embodiment.

FIGS. 25 to 27 illustrate a ninth embodiment of the invention. The difference between the construction shown in FIG. 3 and the construction of the ninth embodiment will be described. The motor 91 employed in the ninth embodiment comprises a stator 92 and an outer rotor 93 enclosing the stator 92. The stator 92 comprises a base 94 formed of a plastic into the shape of a flat circular receptacle and a predetermined number of bobbins 95 radially projecting from an outer circumference of the base 94. Stator cores 96 are inserted in the respective bobbins 95 and a coil 97 is wound on the bobbins 95, so that an armature is constituted. Furthermore, the base 94 has an underside concavity 94a in which an electronic circuit unit 98 for motor drive, which unit will be described later, are provided on a pair of sectorial printed circuit boards 99 around the shaft 24. A number of ventilating through holes 100 are formed in the stator base 100 so as to be located between both ends of the sectorial printed circuit boards 99, as best shown in FIG. 26.

The outer rotor 93 includes a base 101 formed into the shape of a cylindrical receptacle so as to be suited to the stator 92. A rotor section 101a of the rotor base 101 has an inner circumferential surface on which a number of magnets 102 are disposed so as to be opposed to the coil 97 of the stator 92. The rotor base 101 further has a central hollow shaft 101b through which the shaft 24 extends. A cap nut 103 is secured to the lower end of the shaft 24 so that the latter is prevented from falling out. The outer rotor 93 includes four blades 104 radially projecting from the underside of the base 101 and each having an angle section. The underside of the rotor base 101 has a number of ventilating holes 105 formed between each blade and its adjacent one.

Referring to FIG. 27, an electrical arrangement of the washing machine will be described. A control circuit section 106 arranged inside the top cover (FIG. 2) are composed of a DC power-supply circuit 107, a voltage regulator circuit 108 and a main control circuit 109. The DC power-supply circuit 107 supplies a DC voltage obtained by rectifying and then smoothing a AC power supply VAC. The main control circuit 109 is composed of a microcomputer, an analog-to-digital (A/D) converter, a read-only memory (ROM) and a random-access memory (RAM) and stores therein a control program for the washing operation. A predetermined drive output is supplied to the main control circuit 109 via the voltage regulator circuit 108 from the DC power-supply circuit 107.

The electronic circuit unit 98 serving as a drive circuit for the motor 91 is composed of an inverter circuit 110, a base drive circuit 111 and a motor control circuit 112. The inverter circuit 110 includes six bridge connected power transistors 113 serving as switching elements. A DC current from the DC power-supply circuit 107 is supplied via DC power-supply lines L1 and L2 to the inverter circuit 110, which then converts the supplied DC current to a three-phase AC current having a frequency in accordance with the motor speed. The three-phase AC current is supplied to the motor 91. Based on a rotation command signal from the main control circuit 109, the motor control circuit 112 delivers a drive signal to the base drive circuit 111 so that the rotational speed of the motor 91 is controlled in accordance with a detection signal generated by a speed detector 114 detecting the speed of the motor 91, thereby driving the motor 91.

An operation panel 118 provided on the top cover 67 includes an operation switch 119*a* and a display section 119*b* both of which are connected via an input-output (I/O) circuit 115 to the main control circuit 109. A signal delivered by the operation switch 119*a* is supplied to the main control circuit 109. A display signal from the main control circuit 109 is supplied to the display section 119*b* so that a displaying operation is performed by the display section 119*b*. Furthermore, various sensors such a water level sensor are connected to the main control circuit 109 and a load drive circuit 117 for driving various loads such as an electromagnetic valve and a buzzer. Since the inverter circuit 110 is disposed in one of the electronic circuit unit 98, electric supply cables La, Lb and Lc each extending from the inverter circuit 110 to the coil 97 of the motor 91 is short. A control signal line and DC power-supply lines L1 and L2 are provided between the control circuit 106 and the electronic circuit unit 98 provided in the stator 92.

Upon operation of the operation switch 119*a*, the main control circuit 109 executes the control program so that various loads are driven in accordance with the wash or dehydration step and so that a speed command signal in accordance with the wash or dehydration step is supplied to the motor control circuit 112. The motor control circuit 112 delivers a drive signal via the base drive circuit 111 to the inverter circuit 110 so that the speed of the motor 91 takes a value indicated by the speed command signal, whereby the motor 91 is driven at the rotational speed in accordance with the wash or dehydration step.

As the result of rotation of the outer rotor 93 of the motor 91, air striking against inclined side surfaces of the blades 104 is forced downwards, which produces negative pressure. With the negative pressure, the air flows downwards through the ventilating holes 100 and 105 in turn as shown by arrow A in FIG. 25. Since the electronic circuit unit 98 including the inverter circuit 110 is cooled, heat is sufficiently radiated from the power transistors 113 or the like. Consequently, the electronic circuit unit 98 can provide a stable operation. Since each blade 104 has an angle section, air can be securely blown by each blade when the rotation direction of the motor 91 is either clockwise or counterclockwise.

According to the above-described ninth embodiment, the electronic circuit unit 98 including the inverter circuit 110 is disposed in the stator 92 of the motor 91 of the outer rotor type. Consequently, a space inside the top cover 67 can be saved as compared with the prior art in which an electronic circuit unit is provided inside a top cover. Furthermore, the electric supply cables La, Lb and Lc each extending from the inverter circuit 110 to the coil 97 of the motor 91 can be rendered short such that an impedance in the wiring can be lowered. Additionally, since the number of electric supply lines can be reduced by a simple arrangement, adverse affection such as noise on the controlling signal line can be reduced and accordingly, a complicate arrangement such as a separate wiring is not necessitated.

Furthermore, the outer rotor 93 of the motor 91 has four blades 104 and the ventilating holes 105. The stator 92 also has the ventilating holes 100. Consequently, since the electronic circuit unit 98 can be cooled by the flow of air produced by rotation of the rotor 93, the heat radiating effect can be improved.

Additionally, the shaft 24 is directly driven by the motor 91 in the foregoing embodiment. Accordingly, each of the stator 92 and the outer rotor 93 has a large diameter so that a large torque is obtained. Consequently, the stator 92 can provide a sufficient space for disposition of the electronic circuit unit 98. Furthermore, the base drive circuit 111 and the motor control circuit 112 can be provided in the electronic circuit unit 98 as well as the inverter circuit 110, which can promote further space saving.

The foregoing description and drawings are merely illustrative of the principles of the present invention nd are not to be construed in a limiting sense. Various changes and modifications will become apparent to those of ordinary skill in the art. All such changes and modifications are seen to fall within the true spirit and scope of the invention as defined by the appended claims.

We claim:

1. An automatic washing machine comprising:

a hollow outer shaft vertically supported via bearing means on a stationary member to be rotated around a vertical axis thereof, the outer shaft having an upper end;

a rotatable tub for accommodating laundry therein, the rotatable tub having a central bottom coupled to the upper end of the outer shaft so as to be rotated by the outer shaft;

an inner shaft rotatably inserted in the outer shaft with bearing means interposed therebetween, the inner shaft having an upper end projecting from the upper end of the outer shaft;

an agitator coupled to the upper end of the inner shaft and disposed in the rotatable tub;

an electric motor disposed at a side of the stationary member for driving the inner shaft;

control means for controlling the motor;

(f) a first float chamber formed around a portion of the inner shaft projecting from the upper end of the outer shaft and communicating with the rotatable tub to be filled with water when the water is supplied to the rotatable tub in a wash step; and a clutch float disposed in the first float chamber so as to be vertically movable along the inner shaft, the clutch float being movable relative to the rotatable tub, the clutch float being engaged with both of the outer and inner shafts to thereby couple the inner shaft to the outer shaft for transmission of rotation when assuming a first position where the clutch float is escaped from buoyancy, the clutch float being moved from the first position to a second position when subjected to buoyancy, thereby decoupling the inner shaft from the outer shaft.

2. An automatic washing machine according to claim 1, wherein the inner shaft has an outer circumferential face and the clutch float has an inner circumferential face, and wherein the clutch float has a through hole through which the inner shaft extends, and the outer circumferential face of the inner shaft and the inner circumferential face of the clutch float include respective concave and convex engagement portions which are engaged with each other in a direction of rotation of the inner shaft so that the clutch float is rotatable with the inner shaft and movable axially of the inner shaft.

3. An automatic washington machine according to claim 1, wherein the clutch float has gear teeth and the outer shaft has gear teeth meshed with the gear teeth of the clutch float when the clutch float assumes the first position and disengaged from the gear teeth of the clutch float when the clutch float assumes the second position.

4. An automatic washing machine according to claim 3, wherein the clutch float has an outer circumferential face, and the gear teeth of the clutch float comprise external gear teeth formed on the outer circumferential face of the clutch float so as to be circularly arranged and wherein the gear teeth of the outer shaft comprise internal gear teeth formed on the outer shaft so as to be circularly arranged.

5. An automatic washing machine according to claim 4, wherein a row of the external gear teeth has a generally conical outer circumference which is tapered to a distal end thereof invading an inner circumference of a row of the internal gear teeth.

6. An automatic washing machine according to claim 5, wherein the inner circumference of the row of the internal gear teeth has a generally conical configuration corresponding to the outer circumference of the row of the external gear teeth and includes at a larger diameter side an end which has a diameter larger than a diameter of an end of the outer circumference of the row of the external gear teeth at a smaller diameter side of the latter.

7. An automatic washing machine according to claim 1, wherein the clutch float is formed of a foamed polystyrene.

8. An automatic washing machine according to claim 1, wherein the clutch float has an air chamber serving as a buoyancy chamber.

9. An automatic washing machine comprising:

a rotatable tub rotatably mounted and accommodating laundry therein;

an agitator rotatably mounted in the rotatable tub for agitating the laundry;

a shaft operatively associated with the agitator so that the agitator is driven;

an electric motor driving the shaft;

motor control means for controlling the motor;

a second float chamber provided outside the rotatable tub and communicating with the interior of the rotatable tub so as to be filled with water when the water is supplied into the rotatable tub; and (g) a rotation restricting float disposed in the float chamber so as to be vertically movable in subjection to buoyancy, the rotation restricting float coupling the rotatable tub to a stationary member when moved in subjection to buoyancy to thereby assume a first position, thereby restricting free rotation of the rotatable tub, the rotation restricting float decoupling the rotatable tub from the stationary member when assuming a second position where the rotation restricting float is escaped from the buoyancy, thereby releasing the rotatable tub from a restricted state.

10. An automatic washing machine according to claim 9, wherein the rotation restricting float and the stationary member include respective concave and convex engagement portions engageable with each other in a direction of rotation of the rotation restricting float and allowing an axial movement of the rotation restricting float between the first and second positions, wherein the concave and convex engagement portions of the rotation restricting float and the stationary member are engaged with each other so that rotation of the rotation restricting float is restricted by the stationary member, and wherein the rotation restricting float has gear teeth and other gear teeth are provided at the rotatable tub side, the gear teeth of the rotation restricting float being meshed with the gear teeth at the rotatable tub side when the rotation restricting float assumes the first position, whereby rotation of the rotatable tub is restricted, the gear teeth of the rotation restricting float being disengaged from the gear teeth at the rotatable tub side when the rotation restricting float assumes the second position, whereby the rotatable tub is released from a restricted state.

11. An automatic washing machine comprising:

a rotatable tub rotatably mounted and accommodating laundry therein;

an agitator rotatably mounted in the rotatable tub for agitating the laundry;

a shaft operatively associated with the agitator so that the agitator is driven;

an electric motor driving the shaft;

motor control means for controlling the motor;

a first float chamber formed around the shaft and communicating with an interior of the rotatable tub so as to be filled with water when the water is supplied into the rotatable tub;

a clutch float disposed in the first float chamber so as to be vertically movable in subjection to buoyancy, the clutch float coupling the shaft to the rotatable tub when assuming a first position where the clutch float is escaped from the buoyancy, the clutch float moving from the first position to a second position when subjected to the buoyancy, thereby decoupling the shaft from the rotatable tub;

a second float chamber provided outside the rotatable tub and communicating with the interior of the rotatable tub so as to be filled with water when the water is supplied into the rotatable tub; and a rotation restricting float disposed in the second float chamber so as to be vertically movable in subjection to buoyancy, the rotation restricting float coupling the rotatable tub to a stationary member when moved in subjection to buoyancy to thereby assume a third position, thereby restricting free rotation of the rotatable tub, the rotation restricting float decoupling the rotatable tub from the stationary member when assuming a fourth position where the rotation restricting float is escaped from the buoyancy, thereby releasing the rotatable tub from a restricted state.

12. An automatic washing machine comprising:

a stationary tub having a drain hole in a bottom thereof;

a rotatable tub rotatably mounted in the stationary tub for accommodating laundry therein, said rotatable tub having a bottom and an upper portion, the rotatable tub having a hole for drainage of water in the bottom thereof and dehydrating holes formed only in the upper portion thereof so that water therein is discharged through the dehydrating holes into the stationary tub by a centrifugal force due to high speed rotation thereof the rotatable tub;

an agitator rotatably disposed in the rotatable tub for agitating the laundry;

a shaft associated with the agitator to rotate the same;

an electric motor driving the shaft;

motor control means for controlling the motor;

a water guide cover defining a water flow path between the hole formed in the bottom of the rotatable tub and the drain hole of the stationary tub;

a first float chamber formed around the shaft and communicating with the water flow path defined by the water guide cover to be filled with water when the water is supplied to the rotatable tub in a wash step; and a clutch float disposed in the first float chamber so as to be vertically movable when subjected to buoyancy, the clutch float being movable relative to the rotatable tub, the clutch float coupling the shaft to the rotatable tub for transmission of rotation when assuming a first position where the clutch float is escaped from buoyancy, the clutch float being moved from the first position to a second position when subjected to the buoyancy, thereby decoupling the shaft from the rotatable tub.

13. An automatic washing machine comprising:

a rotatable tub rotatably mounted for accommodating laundry therein;

an agitator rotatably disposed in the rotatable tub for agitating the laundry;

a shaft associated with the agitator to rotate the latter;

an electric motor driving the shaft;

motor control means for controlling the motor;

a first float chamber formed around the shaft and communicating with the interior of the rotatable tub to be filled with water when the water is supplied to the rotatable tub in a wash step;

a clutch float disposed in the first float chamber so as to be vertically movable when subjected to buoyancy, the clutch float coupling the shaft to the rotatable tub for transmission of rotation when assuming a first position where the clutch float is escaped from buoyancy, the clutch float being moved from the first position to a second position when subjected to the buoyancy, thereby decoupling the shaft from the rotatable tub; and position determining means for determining as to which of the first or second position the clutch float assumes, thereby generating a position signal.

14. An automatic washing machine according to claim 13, wherein the position determining means comprises means for determining an amount of load applied to the motor during execution of the wash or a dehydration step.

15. An automatic washing machine according to claim 13, wherein the position determining means comprises means for determining a value of current flowing into the motor during execution of the wash or a dehydration step.

16. An automatic washing machine according to claim 13, wherein the position determining means comprises means for determining a value of voltage applied to the motor during execution of the wash or a dehydration step.

17. An automatic washing machine according to claim 13, wherein the position determining means comprises means for determining a rotational speed of the motor during execution of the wash or a dehydration step.

18. An automatic washing machine according to claim 13, wherein the motor control means comprises short period reversion control means for reversing a direction of motor rotation in a short period shorter than a normal reversing period during execution of the wash step so that the motor is intermittently driven, when the position signal generated by the position determining means indicates that the position of the clutch float is abnormal.

19. An automatic washing machine according to claim 18, wherein a mode of control starting with a determining operation of the position determining means and ending with an intermittent drive of the motor by the short period reversion control means is repeated at a plurality of times.

20. An automatic washing machine according to claim 13, wherein the motor control means comprises deceleration control means for decelerating the motor from a current speed thereof when the position signal generated by the position determining means indicates that the position of the clutch float is abnormal.

21. An automatic washing machine according to claim 20, wherein a mode of control starting with a determining operation of the position determining means and ending with deceleration of the motor by the deceleration control means is repeated at a plurality of times.

22. An automatic washing machine according to claim 13, further comprising warning means for warning of an abnormal condition when the position signal generated by the position determining means indicates that the position of the clutch float is abnormal.

23. An automatic washing machine according to claim 1, wherein the motor comprises a stator and a rotor disposed around the stator and the motor control means comprises an electric circuit board disposed on the stator of the motor.

24. An automatic washing machine according to claim 23, wherein the rotor of the motor has a blade and a number of ventilating holes through which a flow of air is circulated by the blade so as to pass in the vicinity of the circuit board.

25. An automatic washing machine according to claim 23, wherein the rotor of the motor is directly connected to the shaft and the motor control means controls a rotational speed of the motor.

* * * * *